United States Patent
Solazzo, Jr. et al.

(10) Patent No.: US 12,229,989 B2
(45) Date of Patent: Feb. 18, 2025

(54) OBJECT ORIENTATION INDICATOR

(71) Applicant: STAKE DRIVE SYSTEMS, LLC, Buffalo, NY (US)

(72) Inventors: Charles F. Solazzo, Jr., Buffalo, NY (US); David Carson, Stuart, FL (US)

(73) Assignee: Stake Drive Systems, LLC, Buffalo, NY (US)

( * ) Notice: Subject to any disclaimer, the term of this patent is extended or adjusted under 35 U.S.C. 154(b) by 340 days.

(21) Appl. No.: 17/662,948

(22) Filed: May 11, 2022

(65) Prior Publication Data

US 2022/0366601 A1 Nov. 17, 2022

Related U.S. Application Data

(60) Provisional application No. 63/187,040, filed on May 11, 2021.

(51) Int. Cl.
| | |
|---|---|
| *G06T 7/73* | (2017.01) |
| *G01C 5/06* | (2006.01) |
| *G01P 21/00* | (2006.01) |

(52) U.S. Cl.
CPC .............. *G06T 7/74* (2017.01); *G01C 5/06* (2013.01); *G01P 21/00* (2013.01)

(58) Field of Classification Search
CPC ......... B25F 5/022; G01C 15/008; G01C 5/06; G01C 9/00; G01P 21/00; G06T 7/74
See application file for complete search history.

(56) References Cited

U.S. PATENT DOCUMENTS

| | | | |
|---|---|---|---|
| 5,948,981 | A | 9/1999 | Woodruff |
| 12,059,792 | B2 * | 8/2024 | Abbott ............... B25F 5/00 |
| 2005/0085983 | A1 | 4/2005 | Campbell et al. |
| 2005/0145029 | A1 | 7/2005 | Stewart |
| 2005/0251294 | A1 | 11/2005 | Cerwin |

(Continued)

FOREIGN PATENT DOCUMENTS

| | | |
|---|---|---|
| EP | 1464615 | 10/2004 |
| EP | 3190421 | 7/2017 |

(Continued)

OTHER PUBLICATIONS

Angelo Maria Sabatini et al., "A Sensor Fusion Method for Tracking Vertical Velocity and Height Based on Inertial and Barometric Altimeter Measurements," Jul. 24, 2014, Sensors 2014, 14, pp. 13324-13343.*

(Continued)

*Primary Examiner* — Omar S Ismail
(74) *Attorney, Agent, or Firm* — McHale & Slavin, P.A.

(57) ABSTRACT

An object orientation indicator for indicating the orientation of an object, such as the vertical positioning of an object to be inserted or being inserted into a surface. The object orientation indicator is configured to determine or indicate when an object being inserted into a surface parallel or non-parallel to the ground is vertically level, i.e. perpendicular to the ground. The object orientation indicator may also be configured to determine or indicate if a preexisting vertical object inserted into a surface parallel or non-parallel to the ground remains in its originally inserted orientation. The object orientation indicator may include a housing assembly and a display panel.

25 Claims, 36 Drawing Sheets

(56) References Cited

U.S. PATENT DOCUMENTS

| | | |
|---|---|---|
| 2013/0104656 A1 | 5/2013 | Smith |
| 2015/0323993 A1* | 11/2015 | Levesque ............... G06F 3/017 |
| | | 345/156 |
| 2015/0362999 A1* | 12/2015 | Kim ..................... G06F 3/014 |
| | | 715/753 |
| 2016/0003863 A1 | 1/2016 | Chau et al. |
| 2016/0171767 A1* | 6/2016 | Anderson ............... G06F 3/011 |
| | | 345/633 |
| 2016/0187976 A1* | 6/2016 | Levesque ............... G06F 3/013 |
| | | 345/156 |
| 2016/0239046 A1* | 8/2016 | Park ..................... G04G 17/08 |
| 2018/0078843 A1* | 3/2018 | Tran .................... G09B 19/0038 |
| 2018/0108147 A1* | 4/2018 | Kim ..................... G06T 7/246 |
| 2018/0117446 A1* | 5/2018 | Tran .................... G06F 1/163 |
| 2018/0164339 A1 | 6/2018 | Zwahlen |
| 2018/0227470 A1* | 8/2018 | Rönngren ............. H04N 5/2628 |
| 2021/0205976 A1 | 7/2021 | Matei |
| 2021/0405701 A1* | 12/2021 | Matei .................. B25F 5/00 |
| 2022/0126435 A1 | 4/2022 | Matei |
| 2024/0011772 A1 | 1/2024 | Matei |

FOREIGN PATENT DOCUMENTS

| | | |
|---|---|---|
| EP | 1932336 | 12/2018 |
| GB | 2443087 | 4/2008 |
| JP | 2001099855 | 4/2001 |
| WO | WO1993006447 | 4/1993 |
| WO | WO1995004284 | 2/1995 |

OTHER PUBLICATIONS

Marco Grossi,"A sensor-centric survey on the development of smartphone measurement and sensing systems," Dec. 3, 2018, Measurement 135 (2019),pp. 572-586.*

Gerhard Schall et al. ,"Global Pose Estimation using Multi-Sensor Fusion for Outdoor Augmented Reality," Nov. 17, 2009, IEEE International Symposium on Mixed and Augmented Reality 2009 Science and Technology Proceedings Oct. 19-22, 2009, Orlando, Florida, USA,pp. 153-162.*

* cited by examiner

OBJECT ORIENTATION INDICATOR

CROSS REFERENCE TO RELATED APPLICATIONS

In accordance with 37 C.F.R. 1.76, a claim of priority is included in an Application Data Sheet filed concurrently herewith. Accordingly, the present invention claims priority to U.S. Provisional Patent Application No. 63/187,040 entitled "OBJECT ORIENTATION INDICATOR" filed May 11, 2021. The content of the above referenced application is incorporated herein by reference in its entirety.

FIELD OF THE INVENTION

The present invention relates to devices and systems for indicating object orientation.

BACKGROUND OF THE INVENTION

The correct orientation of an object being inserted into a surface is critical for functionality. For objects being inserted into a surface which is parallel to the ground, maintaining an orientation such that the object is in a perpendicular position relative to the ground can be critical. Moreover, for objects such as vertical support unit(s) that are part of a structure which is secured to/into the ground, knowledge of the positioning or orientation of the vertical support unit(s) may also be critical in maintaining overall structurally integrity. What is needed, therefore, is an object orientation indicator for indicating the orientation of an object, such as the vertical positioning of an object to be inserted, or as being inserted, or already inserted into a surface, or for determining or indicating if a preexisting vertical object inserted into a surface parallel to the ground remains in its originally inserted orientation.

SUMMARY OF THE INVENTION

The present invention relates to an object orientation indicator for indicating the orientation of an object, such as the vertical positioning of an object to be inserted, or as being inserted, or already inserted into a surface. The object orientation indicator may be configured to determine or indicate when an object being inserted into a surface parallel to the ground, such as when inserting a pole or stake into the ground or driving a nail or stake into a ceiling, is vertically level, i.e. perpendicular to the ground. The object orientation indicator may also be configured to determine or indicate if a preexisting vertical object inserted into a surface parallel to the ground remains in its originally inserted orientation.

Accordingly, it is an objective of the invention to provide a device for indicating object orientation.

It is a further objective of the invention to provide systems for indicating object orientation.

It is yet another objective of the invention to provide a device for indicating orientation of an object which will be inserted into a surface.

It is a still further objective of the invention to provide a device for indicating orientation of an object which is being inserted into a surface.

It is a further objective of the invention to provide a device for indicating orientation of an object which is already inserted into a surface.

It is yet another objective of the invention to provide a device for indicating if a preexisting vertical object inserted into a surface parallel to the ground remains in its originally inserted orientation.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

DETAILED DESCRIPTION OF THE INVENTION

Figure 1A:
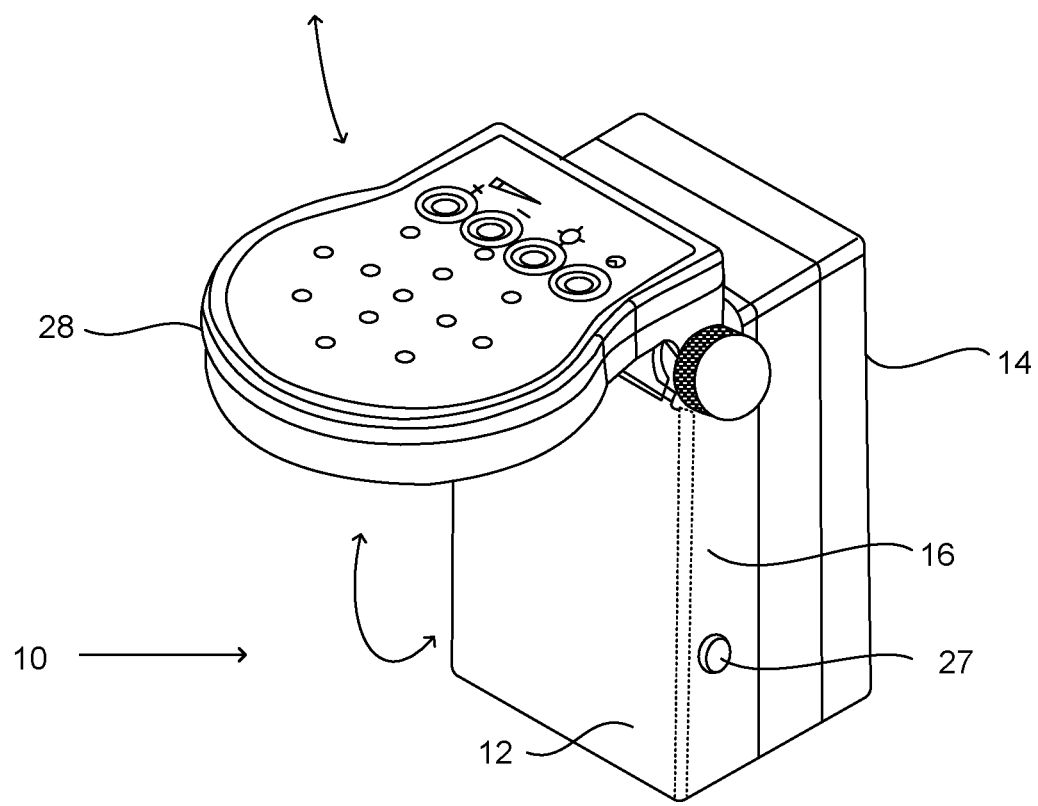
FIG. 1A is a perspective view of an illustrative embodiment of a device for indicating an object's orientation.
Figure 1B:
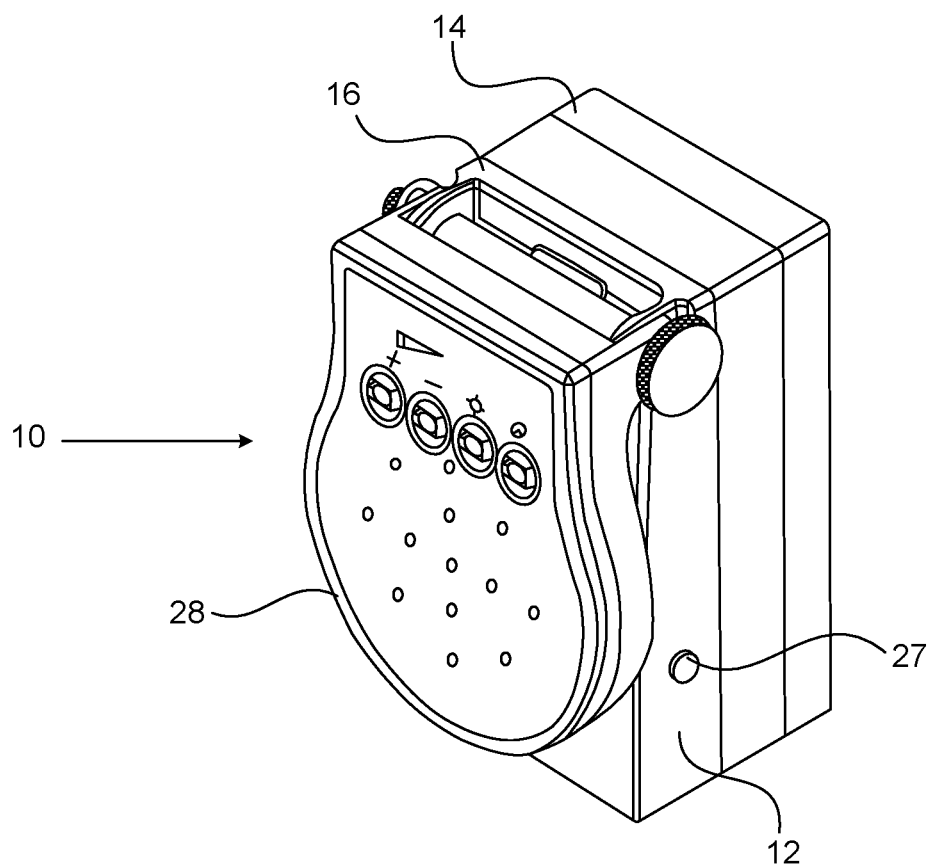
FIG. 1B is a perspective view of the device for indicating an object's orientation, shown with the display panel assembly in the down position.
Figure 2:
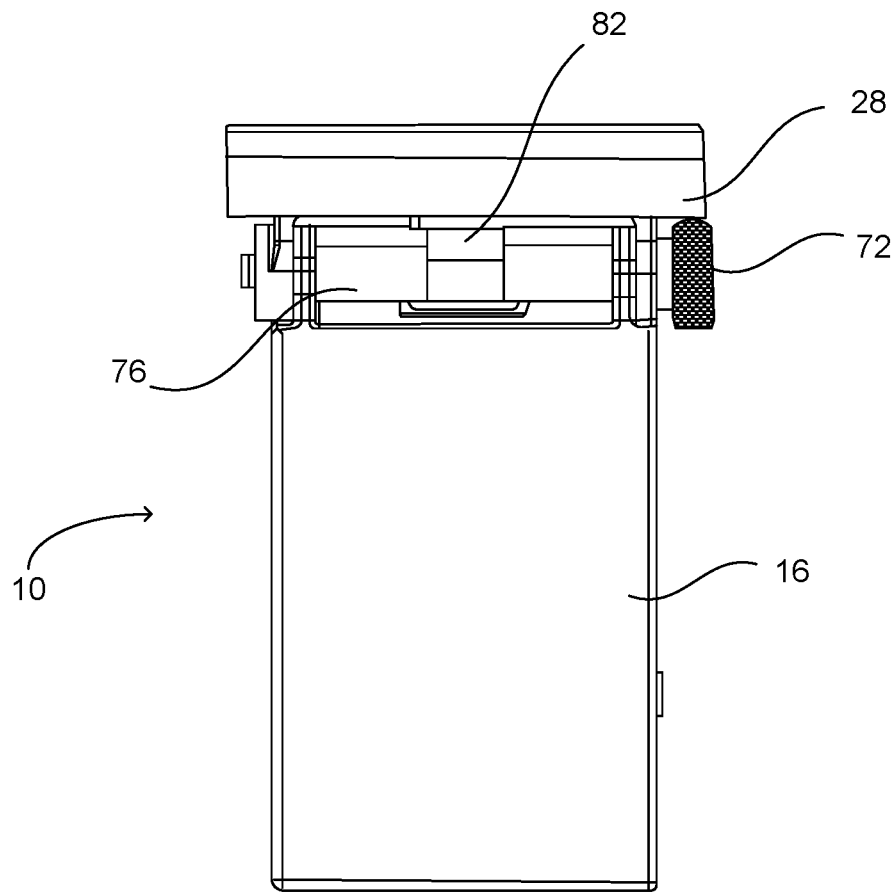
FIG. 2 is a front view of the object orientation indicator.
Figure 3:
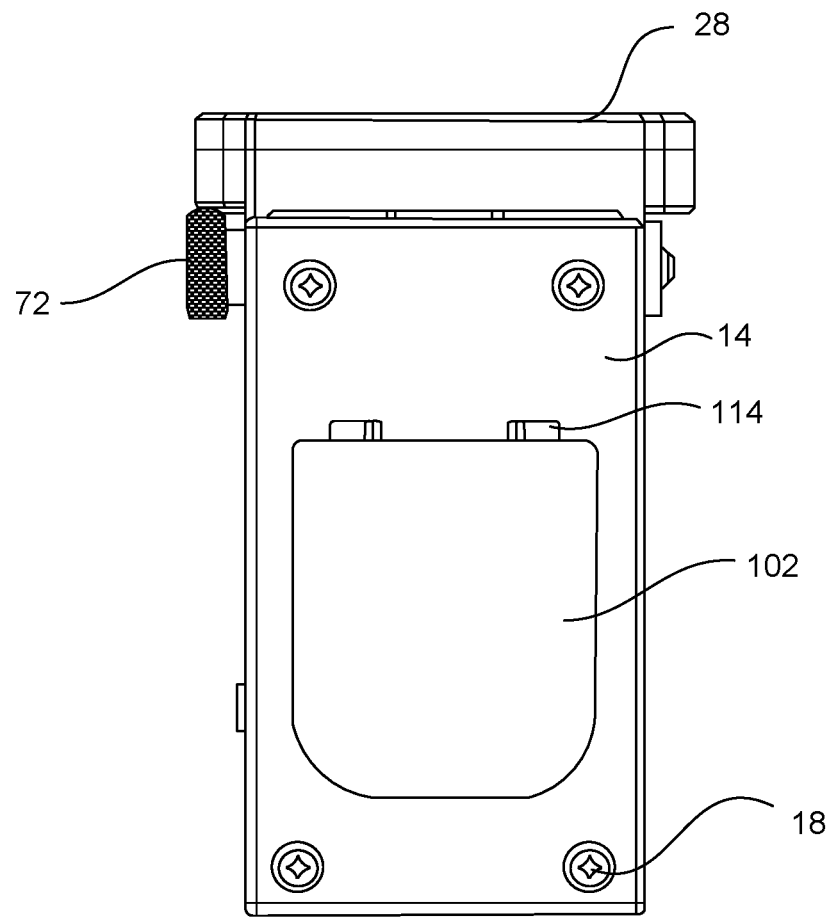
FIG. 3 is a back view of the object orientation indicator.
Figure 4:
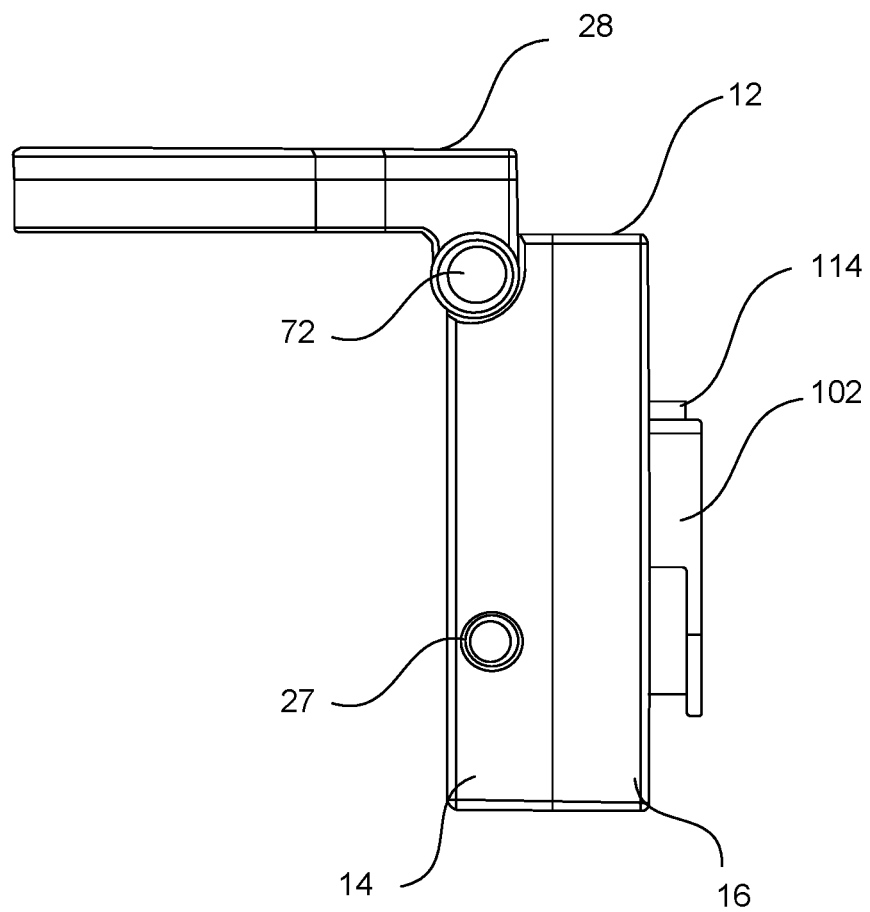
FIG. 4 is a right side view of the object orientation indicator.
Figure 5:
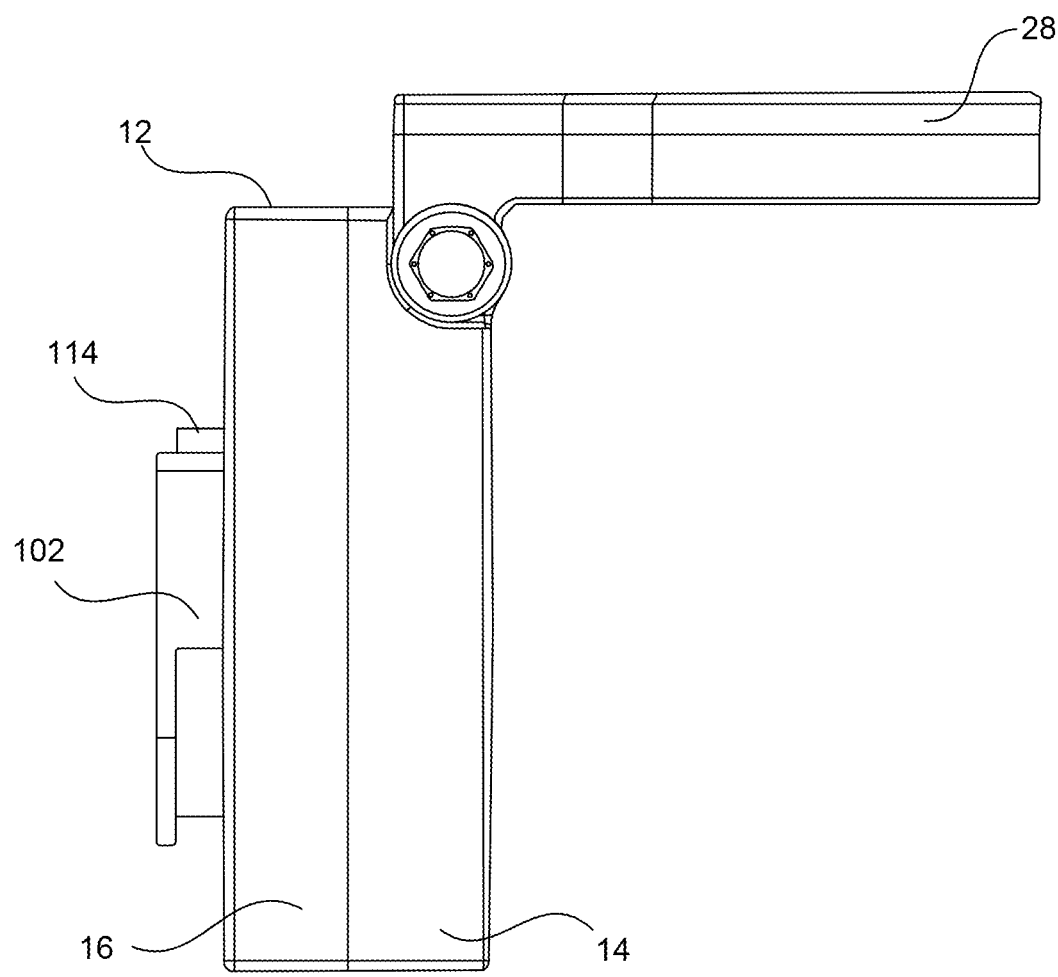
FIG. 5 is a left side view of the device for determining vertical positioning of an object to be inserted into a surface.
Figure 6:
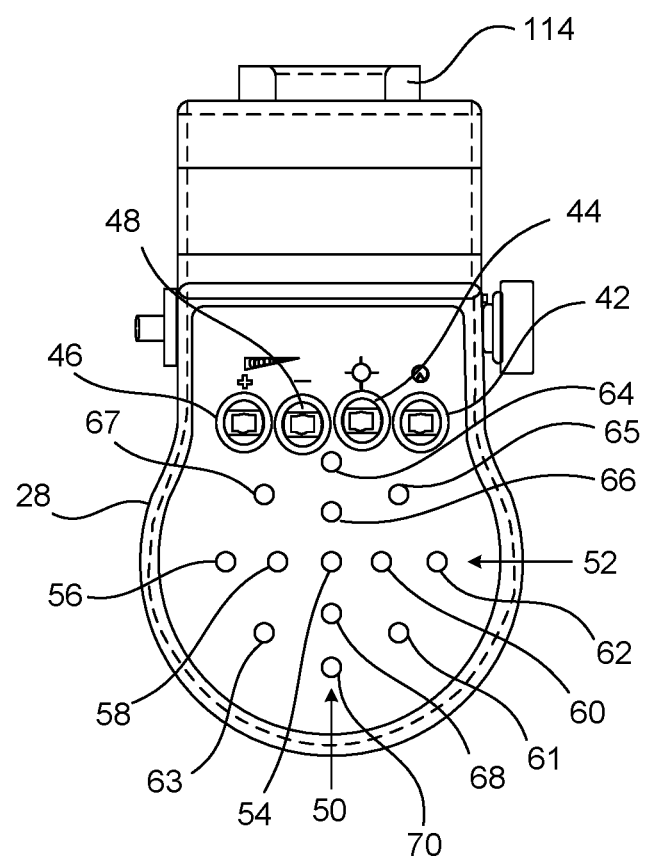
FIG. 6 is a top view of the object orientation indicator.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Embodiments of the invention relate to an electronic device for determining and/or indicating the orientation of an object which may be used as an accessory with other tools, such as a stake driver. The device for determining and/or indicating the orientation of an object is designed for use in a high vibration environment and will produce accurate indication even while subjected to continuous vibration. The electronic device for determining and/or indicating the orientation of an object may be configured to determine or indicate when an object being inserted into a surface parallel to the ground, such as when inserting a pole or stake into the ground or driving a nail or stake into a ceiling, is vertically level, i.e. perpendicular to the ground. The electronic device for determining and/or indicating the orientation of an object indicator may also be configured to determine or indicate if a preexisting vertical object inserted into a surface parallel to the ground remains in its originally inserted orientation.

The electronic device for determining and/or indicating the orientation of an object may be configured to operate in two (2) modes of operation that are selectable with the use of a slide switch. Mode 1 is used to confirm tilt or level position of the device visually and audibly in relation to the earth. Mode 2 is used to visually and audibly confirm tilt and angular relation to a vertical wall, or a surface that is arranged or positioned in non-parallel orientation relative to the ground. Mode 1, which may also be referred to as "stake drive" mode, uses a three (3) axis accelerometer. The three (3) axis accelerometer utilizes gravitational "G" force to electronically measure acceleration "G" force motion in X, Y, or Z direction and/or also electronically capable of measuring two (2) simultaneous angular tilt differentials from a set or "calibrated" position based on the earth's gravity. Voltage measurement results from the three (3) axis accelerometer are sent electronically to a control chip, such as a microcontroller. The microcontroller processes the voltage output signal through a software algorithm that averages the measured voltage signals as per a short time interval and then sends this measured output signal to a visual graphical display such as an LED light, or LED display panel or screen, and simultaneously associates the angular output signal to a specific audible tone frequency. By operating the device in Mode 1, a user can visually and audibly confirm and adjust the angle of the device in relation to the earth.

Mode 2, which may also be referred to as "drill mode", also uses a three (3) axis accelerometer. The three (3) axis accelerometer utilizes gravitational "G" force to electronically measure acceleration "G" force motion in X, Y, or Z direction and/or is also electronically capable of measuring two (2) simultaneous angular tilt differentials from a set or "calibrated" position based on the earth's gravity. In addition, Mode 2 uses two (2) optical sensors which utilize an infra-red optical transmitter and receiver combination that accurately measures distance to an object. The two (2) optical sensors may be mounted in equally offset positions to the device center, and simultaneously detect the tilt position of the device in relation to a surface. Voltage measurement results from the three (3) axis accelerometer and two (2) optical sensors are sent electronically to a control chip, such as a microcontroller. The microcontroller processes the voltage output signal through a software algorithm that averages the measured voltage signals as per a short time interval and then sends this measured output signal to a visual graphical display such as an LED light, or LED display or screen, and simultaneously associates the angular output signal to a specific audible tone frequency. By operating in Mode 2, a user can visually and audibly confirm and adjust the angle of the device in relation to a vertical wall, or a surface that is arranged or positioned in non-parallel orientation relative to the ground.

In use, a user may power ON/OFF the electronic device for determining and/or indicating the orientation of an object. In Mode 1 horizontal, the user may set slide switch (s1) to accelerometer and set slide switch (s2) to horizontal. The user may then align with a horizontal fixture, press the calibration button, and release when the calibration LED light blinks. The tool is ready to use. In Mode 1 vertical, the user may set slide switch (s1) to accelerometer and set slide switch s2 to accelerometer. The user then may align with a vertical fixture, press the calibration button, and release when the calibration LED light blinks. The tool is ready to use. In Mode 2 horizontal, the user may set slide switch (s1) to optical and set slide switch (s2) to horizontal. The user may then align with a horizontal fixture, press calibration button, and release when the calibration LED light blinks. The tool is ready to use. In Mode 2 vertical, the user may set slide switch (s1) to optical and set slide switch (s2) to vertical. The user then may align with a vertical fixture, press calibration button, and release when the calibration LED light blinks. The tool is ready to use.

Referring to FIGS. 1A-7B, an illustrative embodiment of a device for determining and/or indicating the orientation of an object, referred to generally as an object orientation indicator 10, is illustrated. The object orientation indicator 10 may be used for indicating the orientation of an object, such as the vertical positioning of an object to be inserted, or as being inserted, or already inserted into a surface. The object orientation indicator 10 is configured to determine or indicate when an object being inserted into a surface parallel to the ground, such as when inserting a pole or stake into the ground or driving a nail or stake into a ceiling, is vertically level, i.e. perpendicular to the ground. The object orientation indicator 10 may also be configured to determine or indicate if a preexisting vertical object inserted into a surface parallel to the ground remains in its originally inserted orientation. The object orientation indicator 10 is also configured to determine or indicate when an object being inserted into a surface which is non-parallel (i.e. perpendicular to or other angled to) to the ground, such as when inserting a nail, pole or stake into a wall that is perpendicular to the ground or driving, is vertically level, i.e. perpendicular to the ground.

Figure 7A:
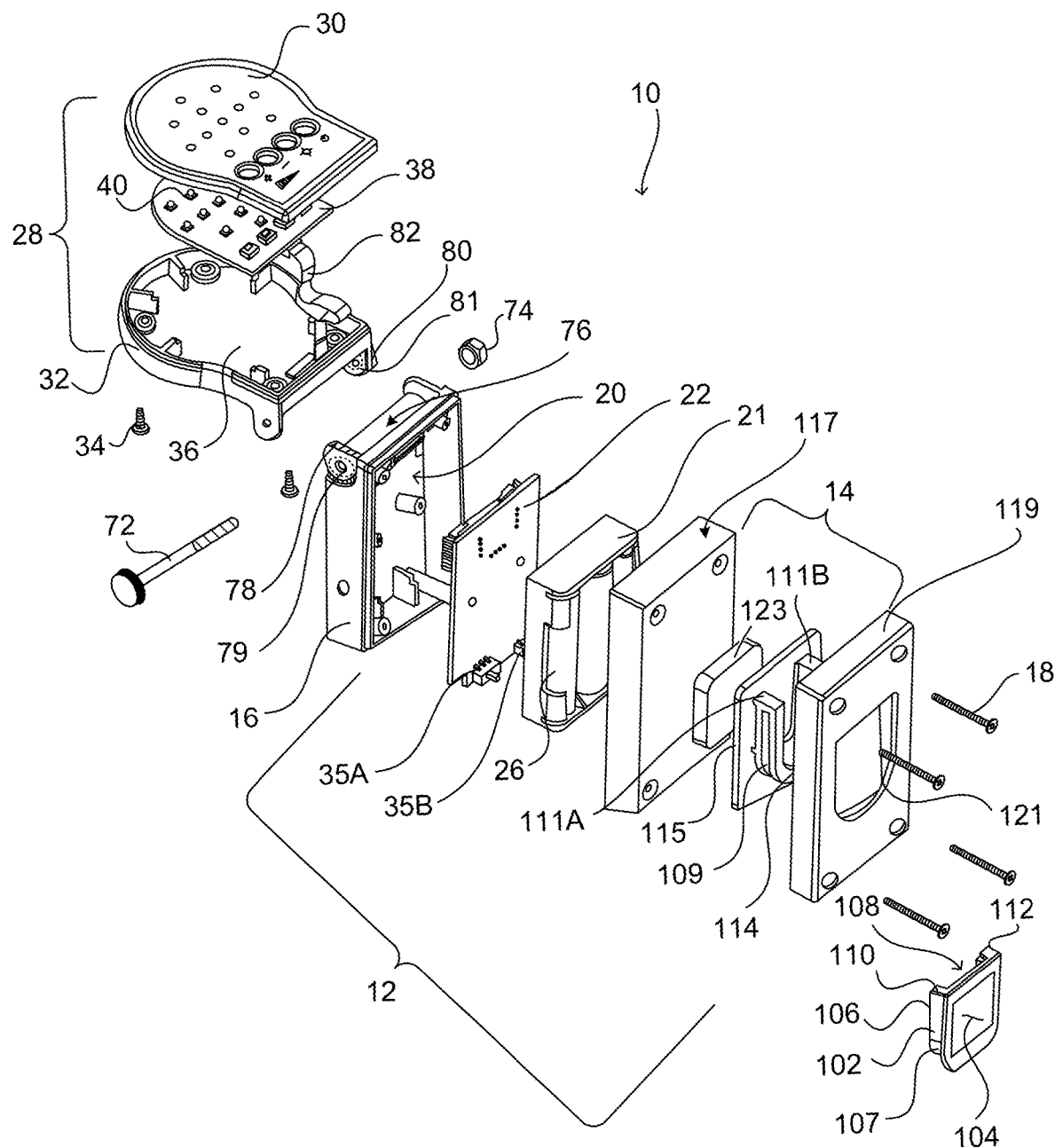
FIG. 7A is an exploded view of the object orientation indicator.
Figure 7B:
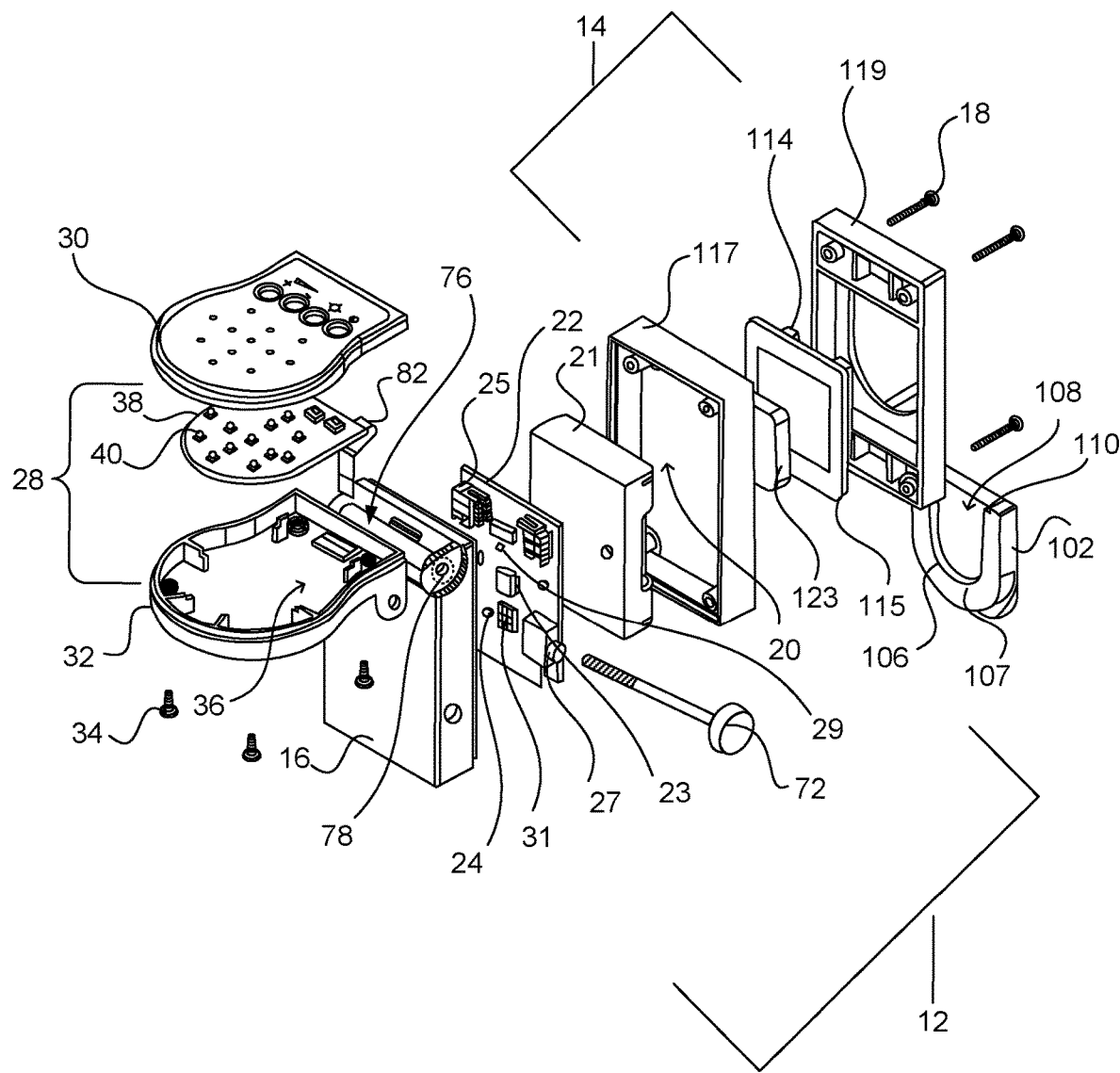
FIG. 7B is an alternative exploded view of the object orientation indicator.

The object orientation indicator 10 may comprise a housing assembly 12 comprising a first housing assembly component 14 secured to a second housing assembly component 16 via fastening members 18, illustrated herein as screws, see FIG. 7A or FIG. 7B. The first housing assembly component 14 and the second housing assembly component 16 are configured to form an interior 20 when secured together. The interior 20 is configured to house one or more structures that drive the functionality of the object orientation indicator 10. The interior 20 may house and secure a printed circuit board (PCB) 22. The printed circuit board (PCB) 22 may include a control unit 23 designed to govern one or more operations, such as a microcontroller, processor (microprocessor), or other type of controller, with memory/storage, software, and any other hardware necessary to perform all functions. The processor may include a general purpose central processing unit(s), application specific processors, and logic devices, as well as any other type of processing device, or combinations or variations thereof. Instructions for the functioning of the object orientation indicator 10 can direct the processor to carry out any of the processes described herein. The printed circuit board (PCB) 22 may also contain one or more header cable connectors 25 and provide for audio/sound functionality, such as through the use of a headphone/ear bud jack connector 27. To provide depth measurement, the object orientation indicator 10 may also include a barometric sensor 29. The barometric sensor 29 allows a user to drive objects into a surface to a consistent depth.

The memory/storage may include any computer readable storage media readable by the processor and capable of storing software, including instructions for the object orientation indicator 10 functioning or operations. The memory/storage may include volatile and non-volatile, removable, and non-removable media, implemented in any method or technology for storage of information, such as computer readable instructions, data structures, program modules, or other data. Illustrative examples of the memory/storage may include storage media, including random access memory (RAM), read only memory (ROM), magnetic disks, optical disks, CDs, DVDs, flash memory, solid state memory, phase change memory, or any other suitable storage media. Certain implementations may involve either or both virtual memory and non-virtual memory. In addition to storage media, in some implementations, the memory/storage may also include communication media over which software may be communicated internally or externally.

Figure 8A:
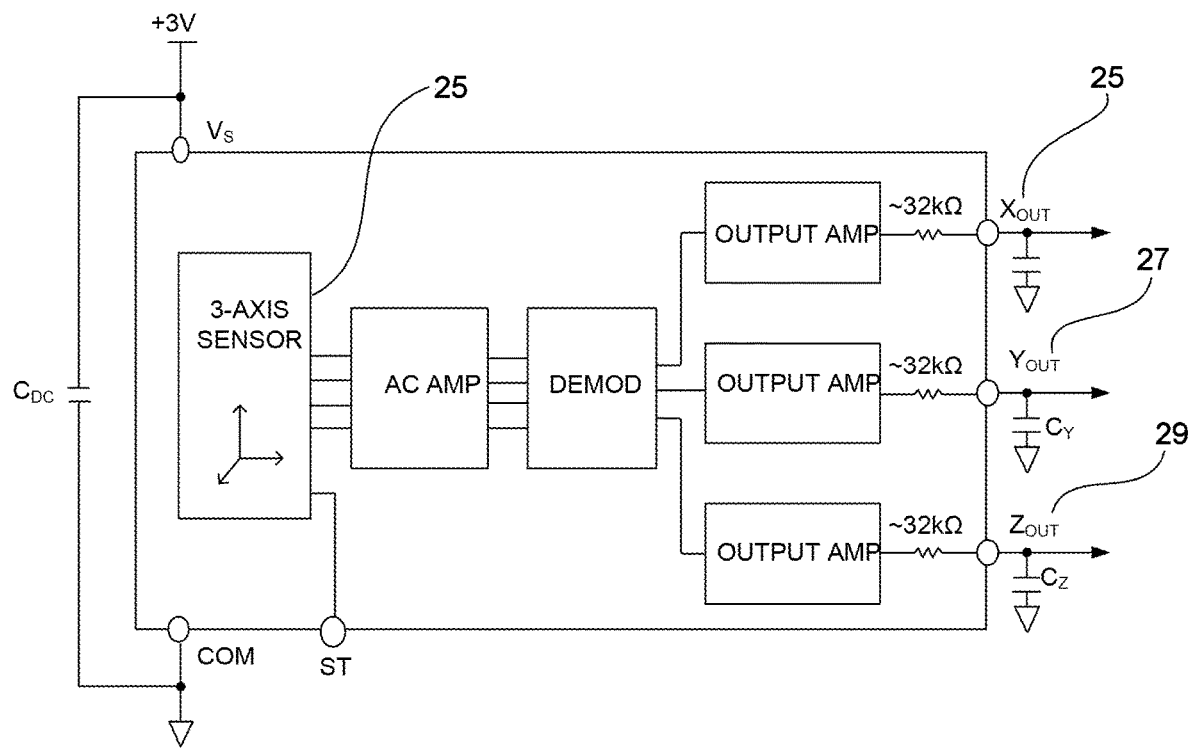
FIG. 8A is a functional block diagram of an illustrative embodiment of an accelerometer.
Figure 8B:
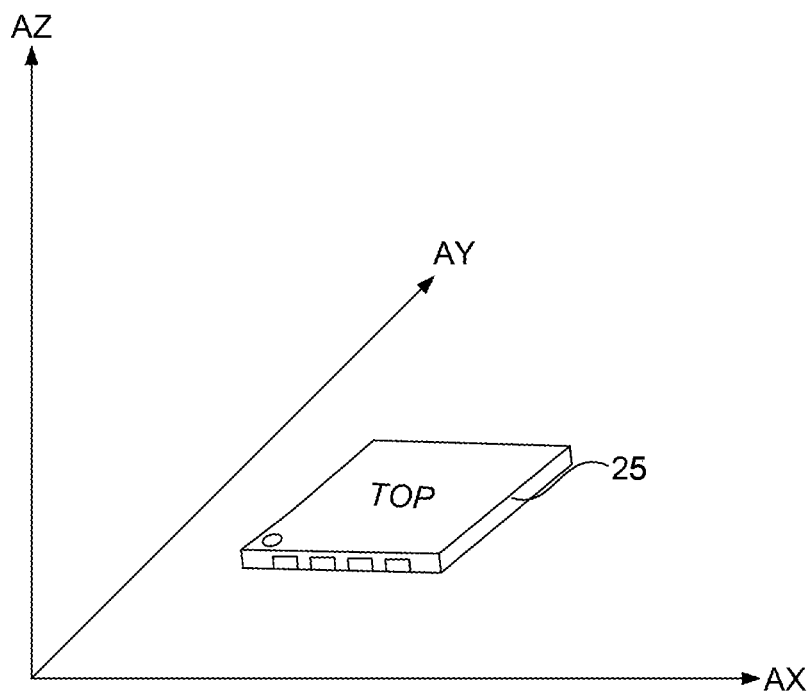
FIG. 8B illustrates the three (3) axes of acceleration sensitivity of the accelerometer.

The printed circuit board 22 may include or operatively be connected to a sensor(s) 24 for use in object orientation indication. The object orientation indicator sensor 24 may be an accelerometer 25, see FIG. 8A, such as a static accelerator from Analog Devices, referred to specifically as the "AD accelerometer". Preferably, two accelerometers are used to allow the object orientation indicator 10 to provide orientation information, i.e. is the object orientated left or right of vertical center. Such measurement allows the user to determine the orientation, preferably how vertical/plumb, of an object that is being inserted into a surface that is parallel with the ground. The AD accelerometer may be a small, thin, low power, complete 3-axis accelerometer with signal conditioned voltage outputs. The AD accelerometer measures acceleration with a minimum full-scale range of ±3 g and can measure the static acceleration of gravity in tilt-sensing applications, as well as dynamic acceleration resulting from motion, shock, or vibration. A user may select the bandwidth of the AD accelerometer using the CX, CY, and CZ capacitors at the $X_{OUT}$ 25, $Y_{OUT}$ 27, and $Z_{OUT}$ 29 pins, see FIG. 8A. Bandwidths can be selected to suit the application, with a range of 0.5 Hz to 1600 Hz for the X and Y axes, and a range of 0.5 Hz to 550 Hz for the Z axis. Although the AD accelerometer may be configured to measure in 3-axis (X-Y-Z), see FIG. 8B, the object orientation indicator 10 preferably will use only 2 axes (X-Y).

The AD accelerometer may contain a polysilicon surface-micromachined sensor and signal conditioning circuitry to implement an open-loop acceleration measurement architecture. The output signals are analog voltages that are proportional to acceleration. The AD accelerometer can measure the static acceleration of gravity in tilt-sensing applications, as well as dynamic acceleration resulting from motion, shock, or vibration. The AD accelerometer sensor may be a polysilicon surface-micromachined structure built on top of a silicon wafer. The AD accelerometer may have polysilicon springs which suspend the structure over the surface of the wafer and provide a resistance against acceleration forces. Deflection of the structure is measured using a differential capacitor that consists of independent fixed plates and plates attached to the moving mass. The fixed plates are driven by 180° out-of-phase square waves. Acceleration deflects the moving mass and unbalances the differential capacitor, resulting in a sensor output wherein amplitude is proportional to acceleration. Phase-sensitive demodulation techniques are then used to determine the magnitude and direction of the acceleration. The AD accelerometer uses a single structure for sensing the X, Y, and Z axes. As a result, the three axes' sense directions are highly orthogonal and have little cross-axis sensitivity. Mechanical misalignment of the sensor due to the package is the chief source of cross-axis sensitivity. Mechanical misalignment can, of course, be calibrated out at the system level.

The accelerometer may be used to allow the object orientation indicator 10 to provide orientation information in multiple directions, i.e. is the object orientated left or right of vertical center and forward or backward of vertical center. Such measurement allows the user to determine the orientation, preferably how vertical/plumb, of an object that is positioned and/or being inserted into a surface that is parallel with the ground.

The interior 20 may also house a power supply 26, illustrated herein as AA batteries. While shown with AA batteries, other types of batteries, such as AAA or lithium coin batteries, such as CR-2032 batteries, may be used as well. The power supply 26 may be held in place by a power supply mount 21. The power supply mount 21 is sized and shaped to receive and hold therein the power supply 26. In certain embodiments, the object orientation indicator 10 may be configured to operatively interact with an independent electronic device, such as a smart phone, computer or computer tablet, such as an APPLE IPAD, smart glasses, or heads-up display, with holographic displaying of the data. Communication may be accomplished using wireless technology, such as WIFI or BLUETOOTH technology. As such, the interior 20 may include wireless technology communication hardware, such as WIFI receivers and/or transmitters, BLUETOOTH receivers and/or transmitters, or any other communication hardware (or software), represented generally as 31 on PCB 22, (see FIG. 7B), known to one of skill in the art.

A display panel assembly 28 provides a user with a visual (and audio) indication of the objects orientation. The display panel assembly 28 may be traversable, or moved from one position, i.e., flipped up (90 degrees from the body 12), see FIG. 1A, to a second position, i.e. flipped down (parallel with body 12), see FIG. 1B, or any position in between. The display panel assembly 28 may comprise a top plate 30 and a bottom plate 32. The top plate 30 and the bottom plate 32 are secured together via fastening members 34, illustrated herein as screw. When secured together, the top plate 30 and the bottom plate 32 form a display panel assembly interior 36. The display panel assembly interior 36 may house therein a display panel 38, thus providing user interface. While described using structural components, the display panel 38 may be a touch screen or LED screen, providing an electronic user interface. The display panel 38 has a plurality of visual indicators 40, illustrated herein as lights, such as LED lights. The visual indicators may be represented as graphical displays, bulls eye or crosshair target, live data stream that can be graphically displayed, or still data that is graphically displayed as well. If configured for audio functionality, the display panel assembly interior 36 may have a speaker stored therein. The display panel 38 may also include one or more functioning buttons, including a power ON/OFF button 42, a calibration button 44, an increase in light (or sound) button 46 for increasing the light (or sound) output of the LEDs or sound, and a decrease in light (or sound) button 48 for decreasing the light (sound) output of the LEDs or sound, see FIG. 6. Use of buttons provides a tactile user interface. The plurality of visual indicators 40 are shown to have a first row of lights 50 and second row of lights 52.

The data related to the position of the object being measured obtained by the one or more sensors, i.e., the accelerometers, optical sensors, barometric sensor, or combinations thereof, are converted into sound and/or visual positioning representations with lights or other visual indicators (such as graphical representations on an LED screen). The first set of lights 50 intersect the second set of lights 52 to form a cross. Such pattern represents the quadrants, indicating the orientation of the object to be analyzed. For example, light 54 might indicate a parallel or centered object relative to the ground. Lights 56 (far) and 58 (close) may indicate the object being in a non-parallel or right of center orientation. Lights 60 (close) and 62 (far) may indicate the object being in a non-parallel or left of center orientation. Lights 64 (far) and 66 (close) may indicate the object being in a non-parallel or back of center orientation. Lights 68 (far) and 70 (close) may indicate the object being in a non-parallel or forward of center orientation. While the display panel assembly is shown using rows of lights, the display panel 38 may be an LED screen, displaying other visual indicator messages, such as a cross-hair symbol or rings.

When using the optical sensors (visually confirming and adjusting if needed the angle of the device 10 in relation to a vertical wall), light 61 may indicate the object being in a non-parallel or left forward position. Light 63 may indicate the object being in a non-parallel or right forward position. Light 65 may indicate the object being in a non-parallel or left back position. Light 67 may indicate the object being in a non-parallel or right back position.

The display panel 38 may also be configured to include a single light preferably with audio. Alternatively, the object orientation indicator 10 may be configured having only a single light indicator. In either of these embodiments, the light is configured to blink (preferably at accelerated rates) as the object being measured approaches the correct orientation, i.e. towards the center and in a parallel arrangement relative to the ground. Once reaching the correct orientation, the single light may change colors and remain lit. An audio message may be activated in this position as well. If the object orientation indicator 10 requires calibration, the single light may blink at a different rate or blink sequence, and/or provide and therefore display a different color output. The object orientation indicator 10 may also be configured with the option of using vibration via wireless communication with an independent device, such as a BLUETOOTH wireless headset that vibrates (LG TONE ACTIVE headset) to provide touch sense, as sight and sound are being used.

To aid the user in visualizing the message displayed on the display panel assembly 28 at different positions, the display panel assembly 28 may be adjustably attached to the object orientation indicator housing assembly 12. The display panel assembly 28 may be secured to the housing assembly 12 via a pivot bolt 72, illustrated herein as a thumb screw, and nut 74. The pivot bolt 72 may be covered by a sheath 76. Display angle adjuster/selector portions 78 (shown as a body having teeth 79) on the second housing assembly component 16 and the display angle adjuster/selector portions 80 (shown as a body having teeth 81) on the object orientation indicator display panel assembly bottom plate 32 allows the display panel assembly 28, and therefore the display panel 38, to traverse or move between multiple, different positions. The display panel 38 may be traversed step wise to allow for greater control in placing at the various positions. Preferably, the display panel assembly 28 moves at different adjustable positions in a step like manner, similar to movement using a ratchet system. The display panel assembly 28 may also be secured to the object orientation indicator housing assembly 12 via a rope or ribbon 82. Preferably, the display panel assembly 28 may be traversed or moved from a first position, which is oriented parallel to the object orientation indicator housing assembly 12, to a second position, which is oriented perpendicular to the object orientation indicator housing assembly 12, or any position therebetween.

Figure 9A:
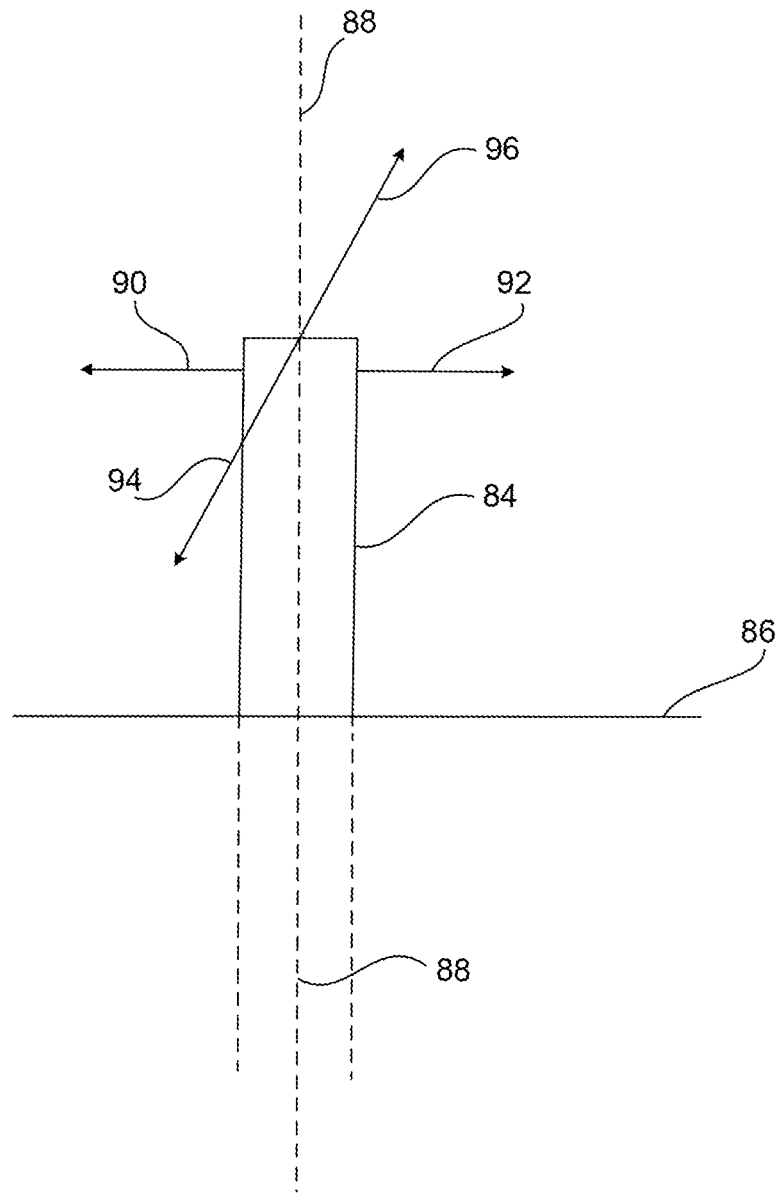
FIG. 9A illustrates the use of the object orientation indicator for objects inserted into a surface which is parallel to the ground.

Referring to FIG. 9A, an object illustrated as a rod 84 is shown in a vertical orientation relative to the ground 86. As the rod 84 is inserted into the ground, it is preferable that the longitudinal axis 88 remains centered or perpendicular to the ground 86 as it is inserted and placed into the ground 86. To ensure that the rod 84 is inserted in the correct orientation, a user would utilize the object orientation indicator 10 to indicate the objects orientation. If the object's 84 orientation is not correct, either too far to the left, see arrow 90, FIG. 9A, or too far to the right, see arrow 92 (X-Axis determination), or too forward, see arrow 94 or too backwards, see arrow 96 (Y-axis determination), the object orientation indicator 10 would visually (and audibly) alert the user as such. The cross-shaped arranged plurality of visual indicators 40 on the display panel assembly 28 may light up in a pattern corresponding to the direction the object 84 is orientated, thus allowing the user to correct the orientation.

Figure 9B:
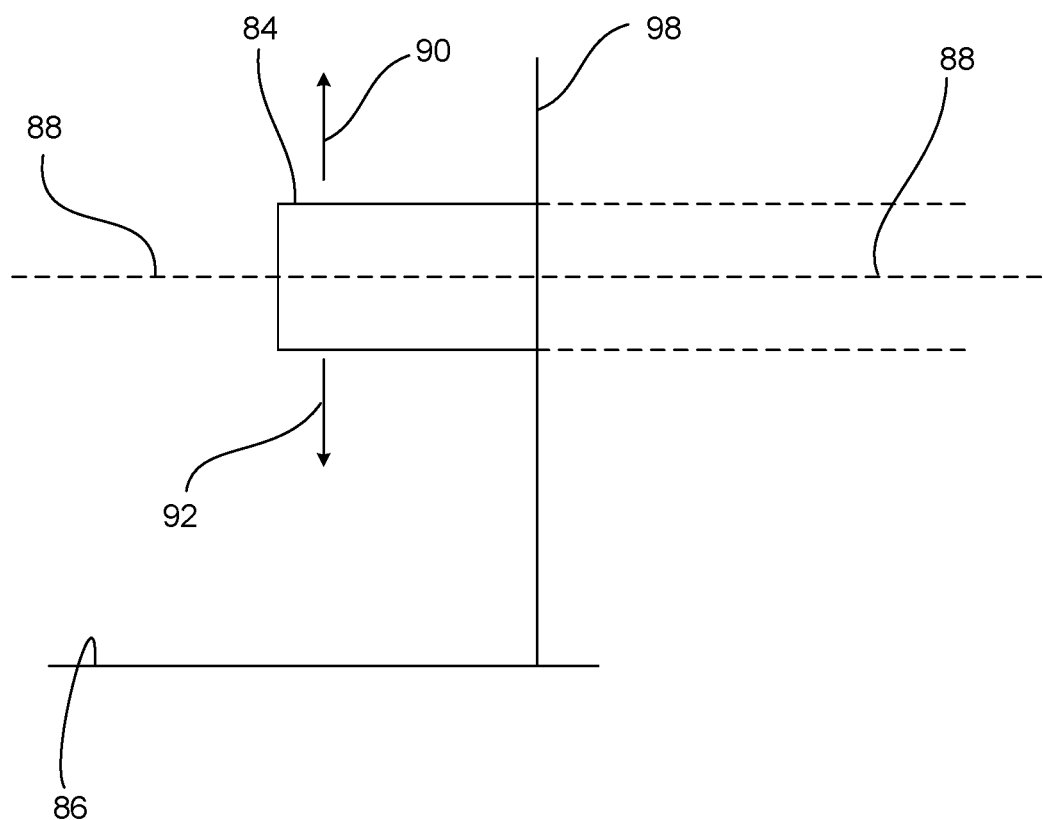
FIG. 9B illustrates the use of the object orientation indicator for objects inserted into a surface which is perpendicular to the ground.

FIG. 9B illustrates the use of the object orientation indicator 10 for an object orientation when the object 84 is inserted into a surface 98 which is perpendicular to the ground 86. In this case, the object orientation indicator 10 may be used to determine an orientation along one axis (X-axis, arrows 90 and 92), but not two (not Y-axis). The determination of object orientation along the second axis may be accomplished through the use of two proximity sensors.

Figure 10:
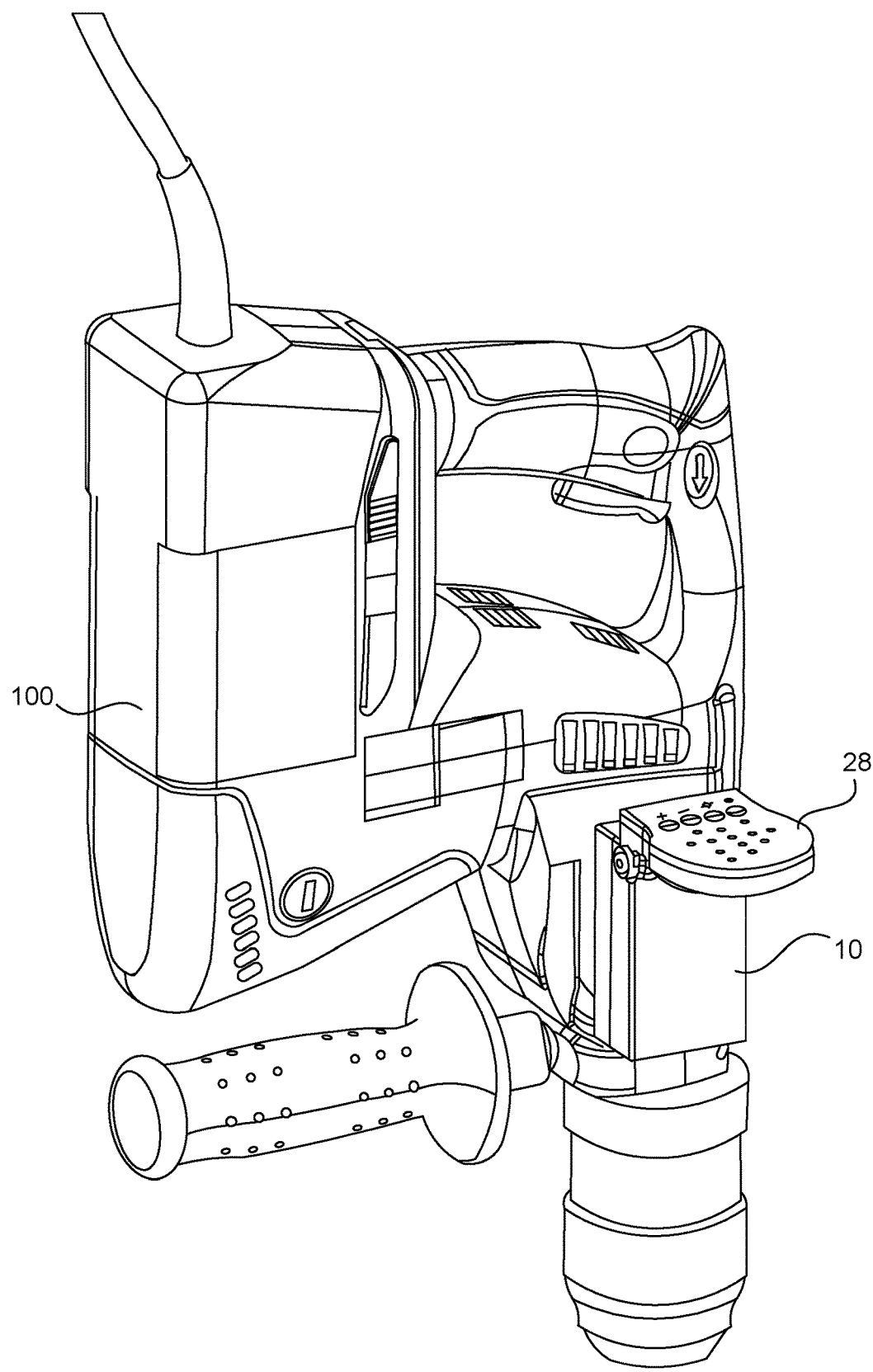
FIG. 10 illustrates the object orientation indicator secured to a hammer drill.
Figure 11:
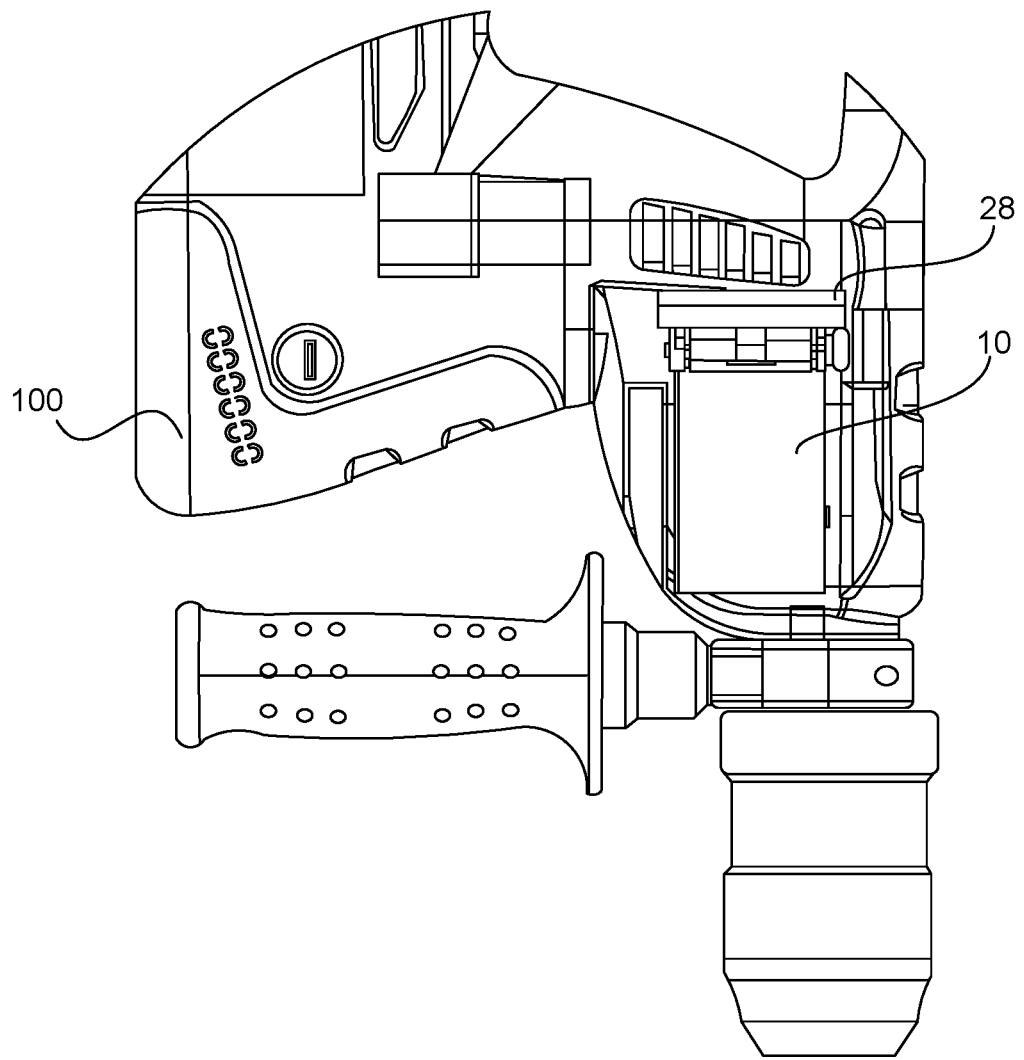
FIG. 11 is an alternative view of the object orientation indicator secured to a hammer drill.
Figure 12:
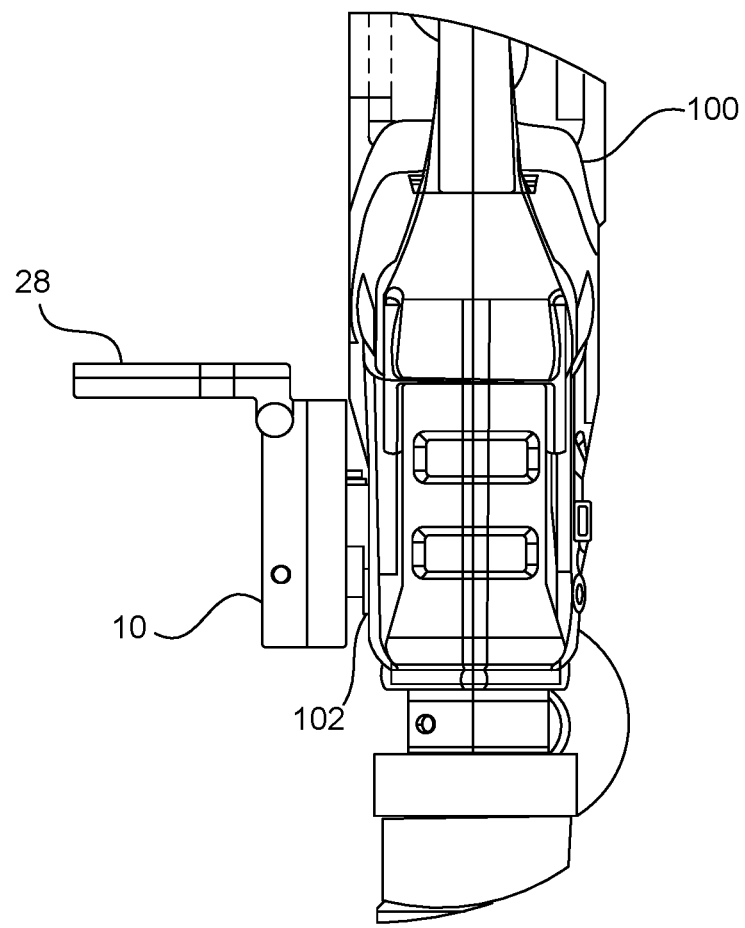
FIG. 12 is an alternative view of the object orientation indicator secured to a hammer drill.
Figure 13:
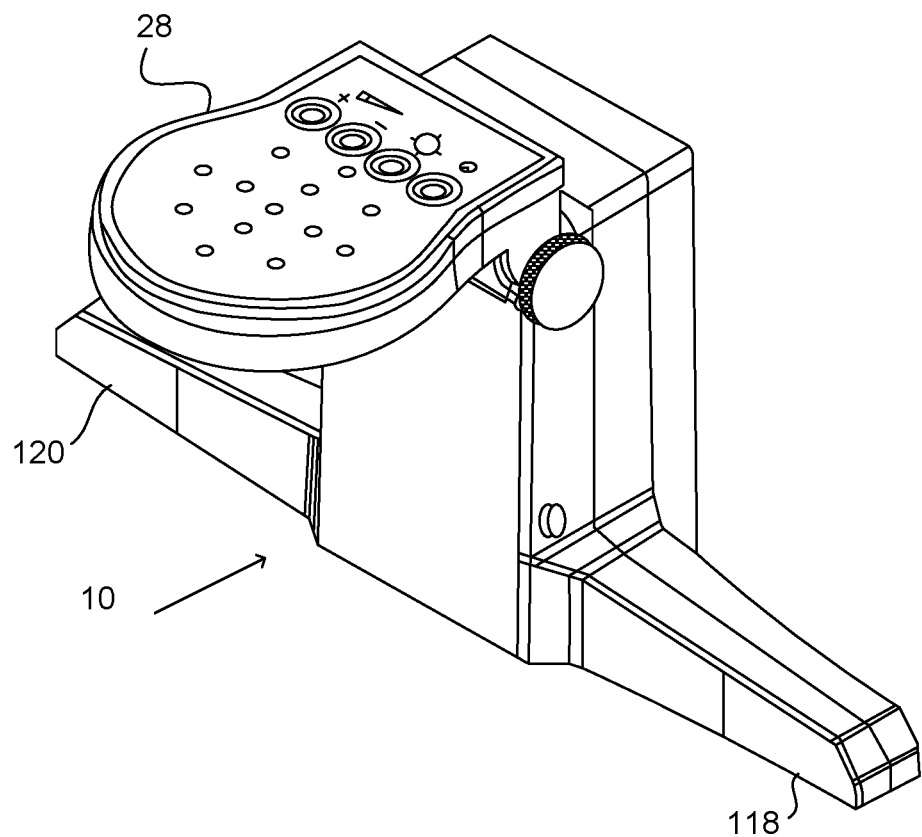
FIG. 13 is a perspective view of the object orientation indicator with optical sensors, shown with the display panel assembly arranged in the up position.
Figure 14:
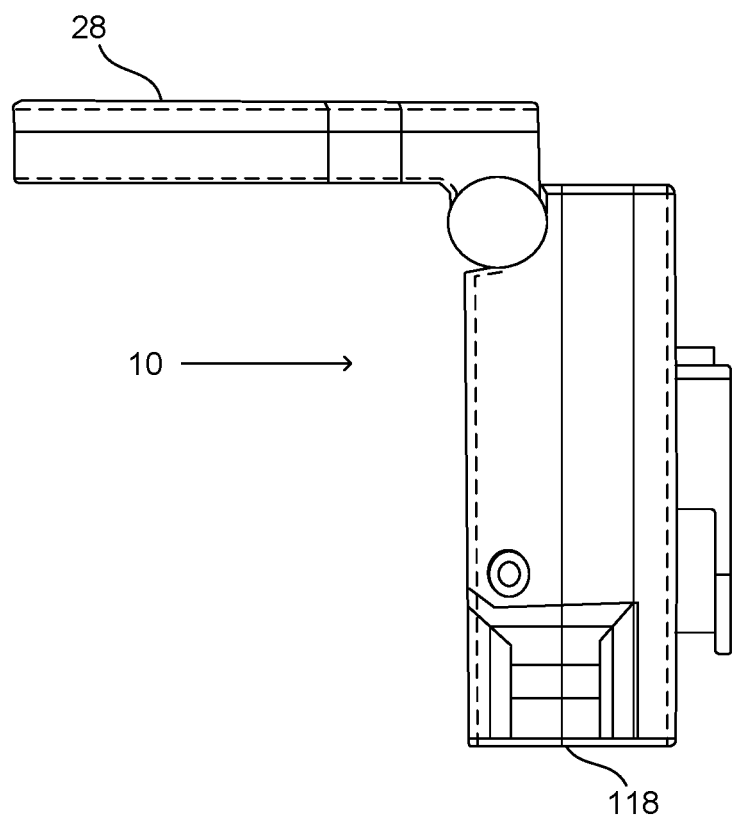
FIG. 14 is a side view of the object orientation indicator shown in FIG. 13.
Figure 15:
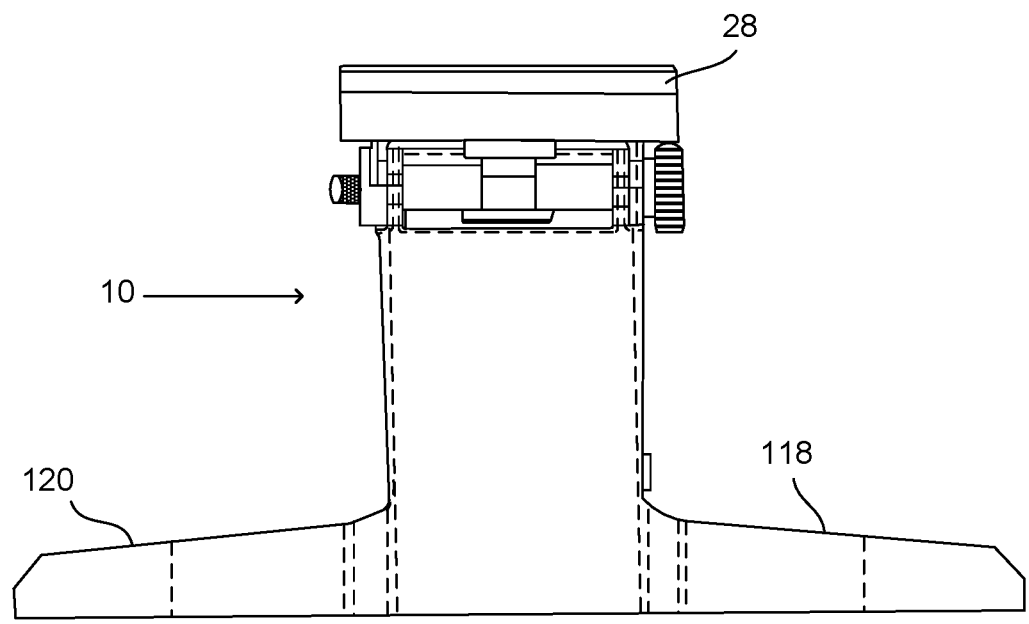
FIG. 15 is a front view of the object orientation indicator shown in FIG. 13.
Figure 16:
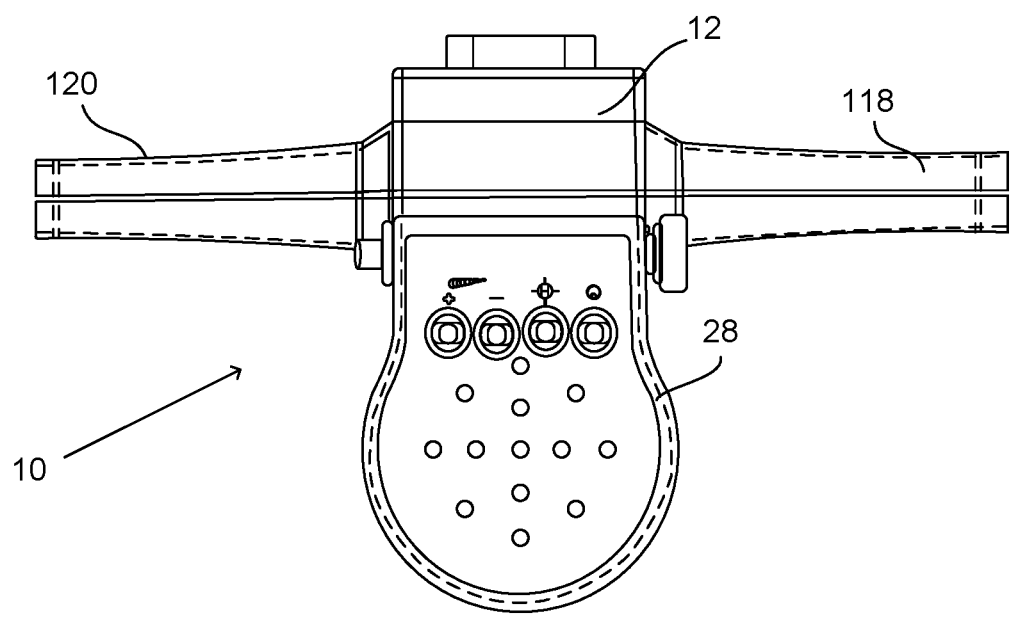
FIG. 16 is a top view of the object orientation indicator shown in FIG. 13.

The object orientation indicator 10 may be configured to be removably secured to an independent object or device. Referring to FIGS. 10-12, the object orientation indicator 10 is shown secured to a hammer drill 100 via a dock 102 (dock 102 shown in FIGS. 7A, 7B). The dock 102 comprises a first surface 104 which secures to the independent device, i.e. the hammer drill 100, via a fastening member, such as a mechanical fastening member, i.e. screws, or chemical fastening member, i.e. glue. The dock 102 may also include an object orientation indicator locking receiving member 106, illustrated herein comprising a channel 108, a body 107 and tabs or overhangs 110 and 112, sized and shaped to engage with or receive and hold therein an object orientation indicator locking member 114, illustrated herein as a U-shaped body, via channel 109 and upper surfaces 111A and 111B, acting as a stop.

The object orientation indicator locking member 114 is secured to (such as for example via a support bracket 115) or integrally from the first housing assembly component 14 and is sized and shaped to be inserted within and engage with the object orientation indicator locking receiving member 106. As shown, the first housing assembly component 14 may comprise a first or inner member 117 and a second or outer member 119. The second or outer member 119 may include a cut out section sized and shaped to allow the object orientation indicator locking member 114 to extend out therefrom. Placed between the support bracket 115 and the first or inner member 117 of the first housing assembly component 14 is an anti-vibration member 123, illustrated herein as double sided foam tape. The anti-vibration member 123 is deigned to cushion against vibration.

In addition to the use in indicating an object's orientation as it is being inserted into a surface, the object orientation indicator 10 may be used to indicate if the orientation of a preexisting object inserted into a surface, such as a tower or support structure, has changed or deviated from its original orientation. In this use, the object orientation indicator 10 may be attached to the object. If the object moves as a result of a force, such as a severe wind event or seismic event, the object orientation indicator 10 would indicate 1) an orientation movement, and 2) which direction of movement (or change in orientation) occurred.

In an alternative embodiment, the object orientation indicator 10 may take the form of an electronic device, such as as smart phone or tablet, having the necessary software and/or hardware, such as object orientation indicator sensor 24, to indicate an object orientation in any manner as described above. The electronic device, i.e., smart phone or tablet, may be enclosed or housed within a protective case, such as a plastic case, a shock proof case, or water proof case, to prevent damage when in use and/or to attach to an independent device, such as the hammer drill 100.

Figure 17:
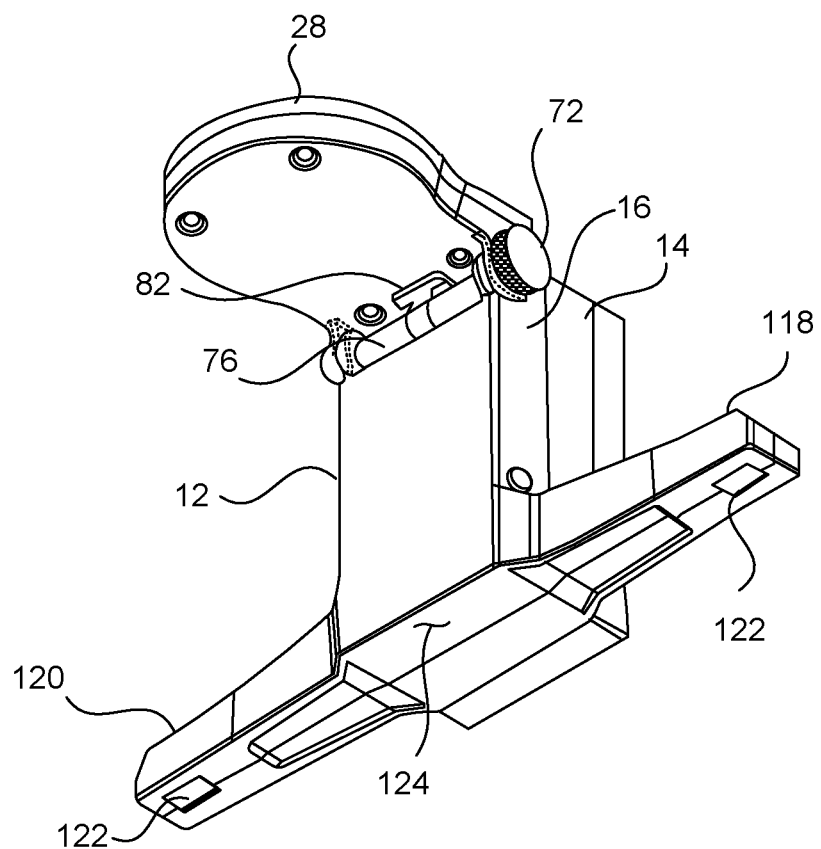
FIG. 17 is a bottom perspective view of the object orientation indicator shown in FIG. 13.
Figure 18:
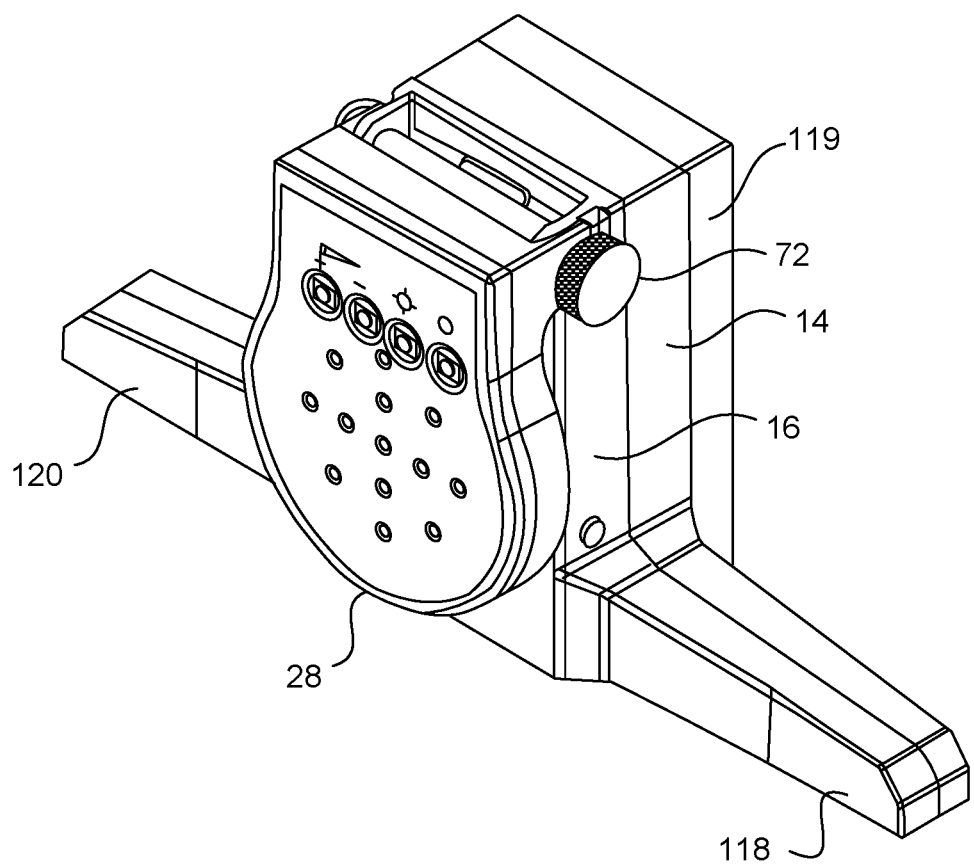
FIG. 18 is a perspective view of the object orientation indicator with optical sensors, shown with the display panel assembly arranged in the down position.
Figure 19A:
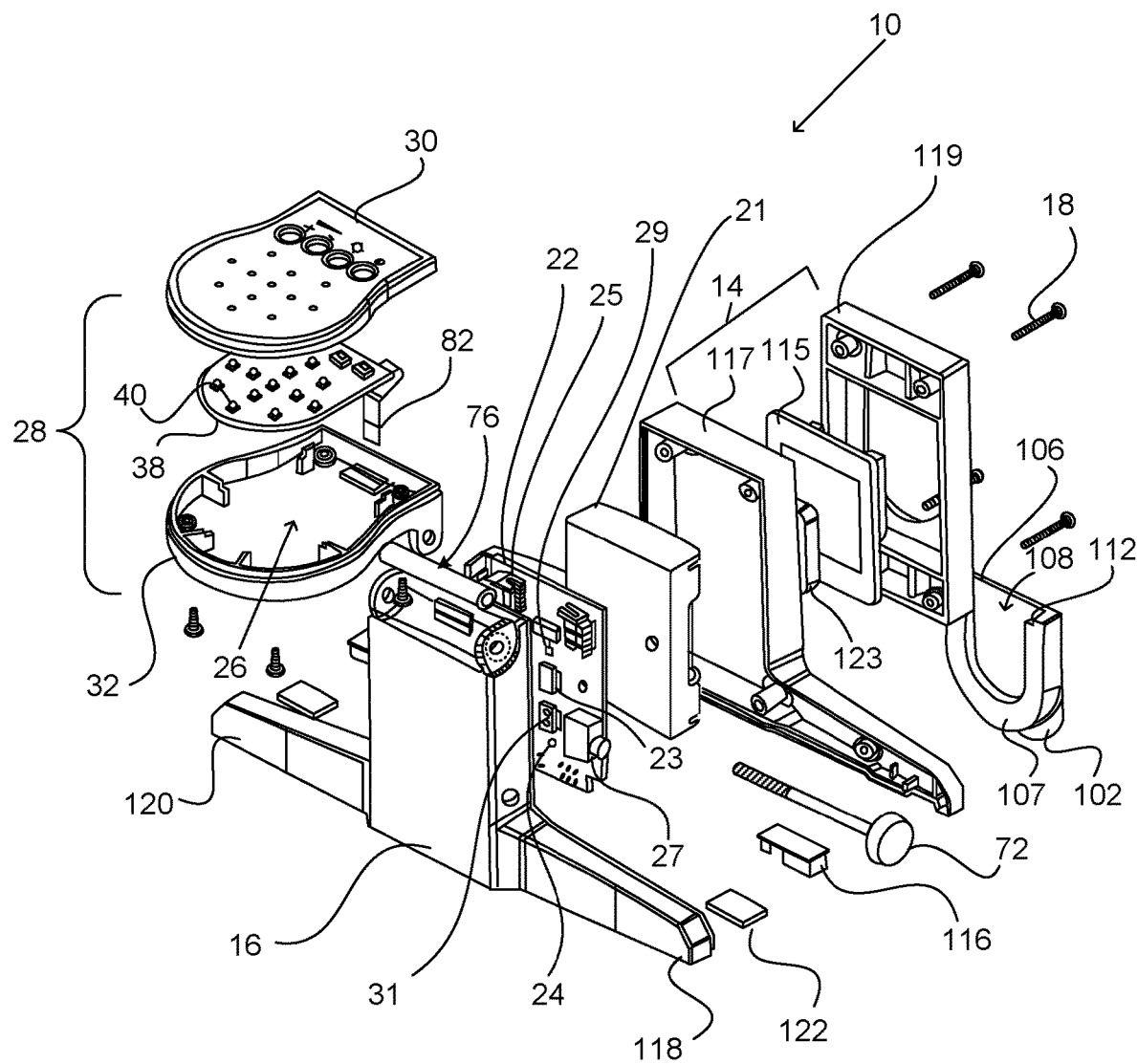
FIG. 19A is an exploded view of the object orientation indicator shown in FIG. 13.
Figure 19B:
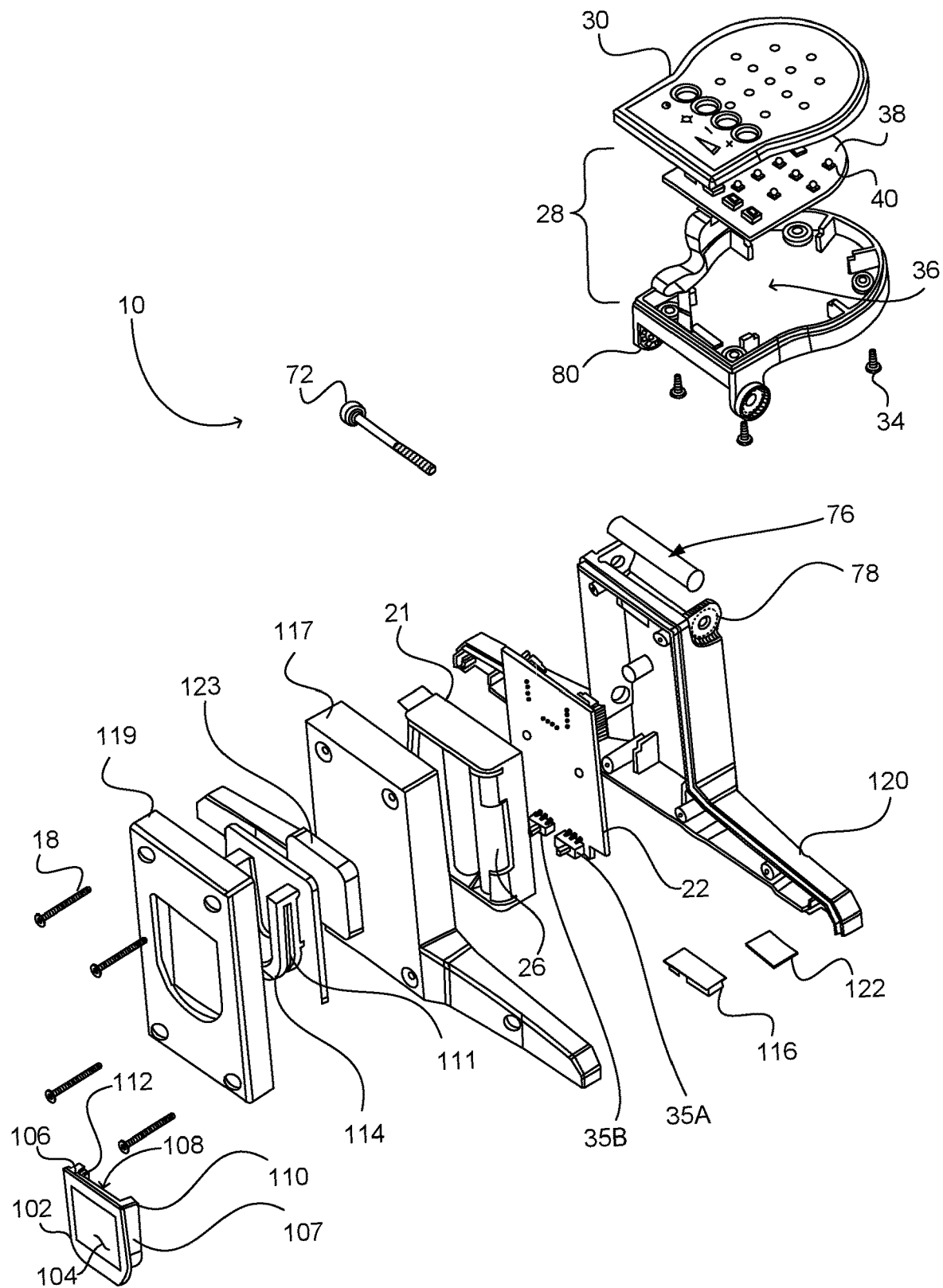
FIG. 19B is an alternative exploded view of the object orientation indicator shown in FIG. 13.
Figure 20:
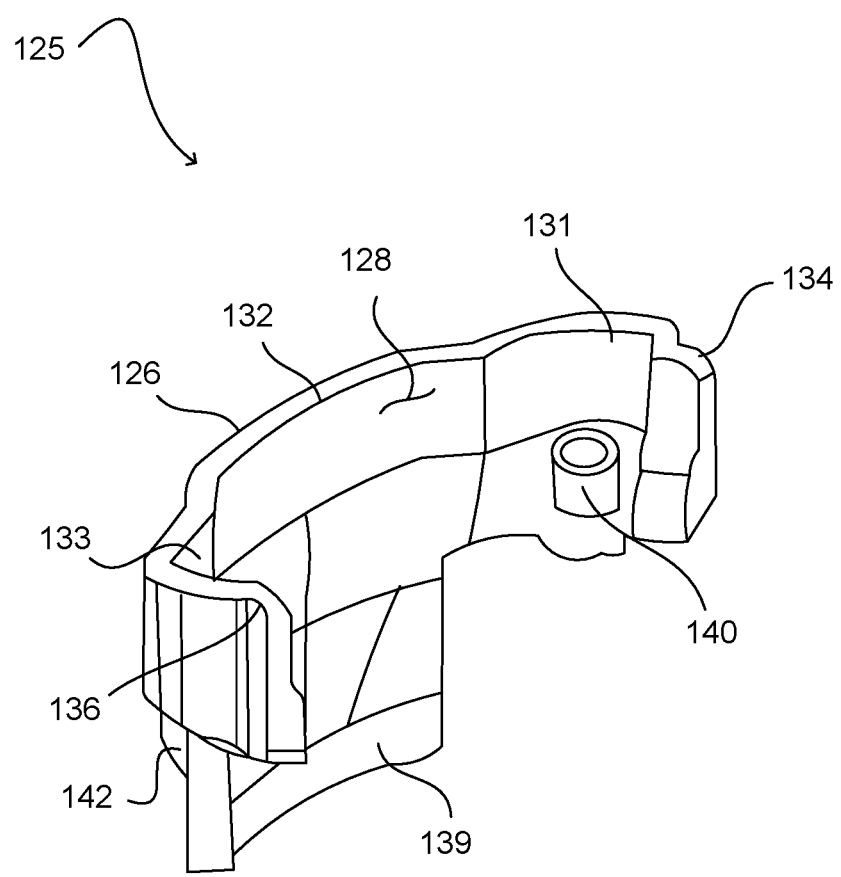
FIG. 20 is an illustrative example of a 1-position tool mount.
Figure 21:
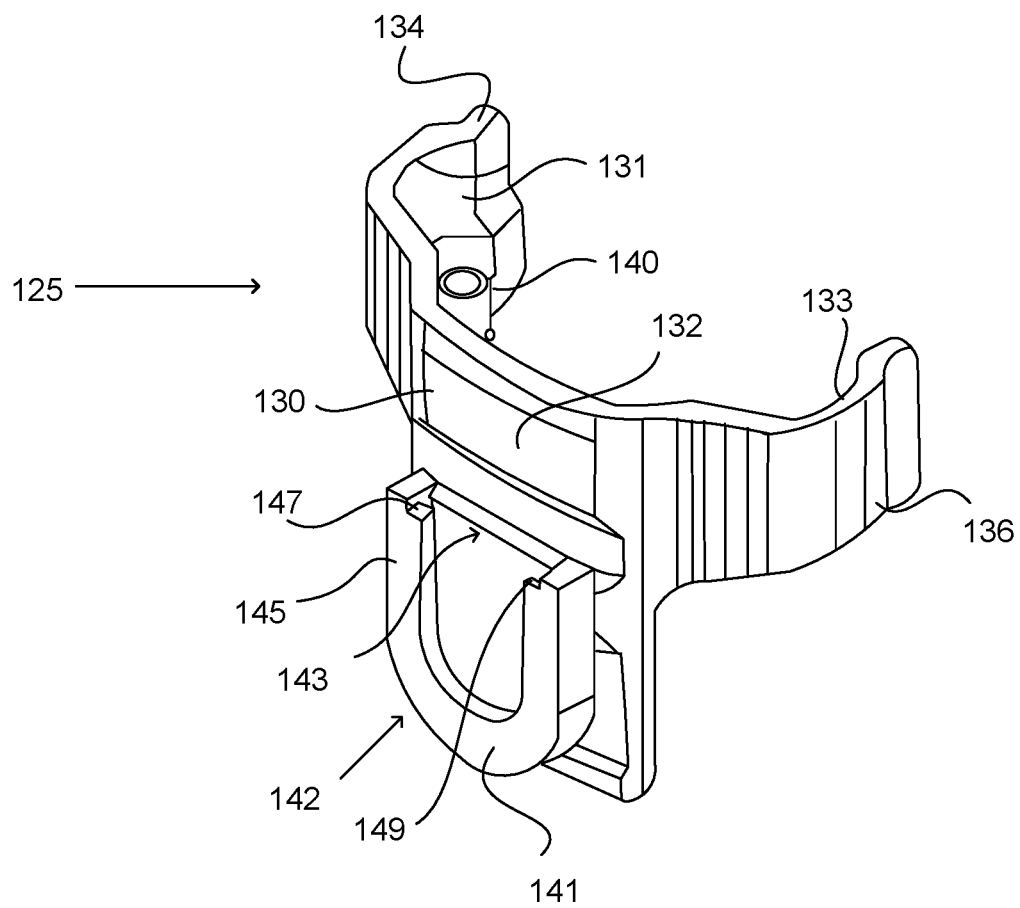
FIG. 21 is an illustrative view of the 1-position tool mount.

Referring to FIGS. 13-29, the object orientation indicator 10 may also have the functionality of providing orientation information, i.e. is the object orientated left or right of vertical center of an object that is positioned and/or being inserted into a surface that is non-parallel (angled, such as 90 degrees, more than 90 degrees, less than 90 degrees) to the ground. Similar to that described above, the object orientation indicator 10 may be designed to utilize a flip up/down display panel assembly 28, see FIGS. 14-17, flipped up, FIG. 18, flipped down. Stored with the first housing assembly component 14 and/or the second housing assembly component 16 are optical sensors (distance sensor, 3.3V, 1.5" to 19.6") 116, see FIG. 19A and FIG. 19B. The optical sensors 116 are placed and secured within a first arm 118 and a second arm 120. The two (2) optical sensors may be mounted in equally offset positions to the device center, and simultaneously detect the tilt position of the device in relation to a surface. Referring to FIG. 17, optical sensors 116 (not seen) are behind an optical sensor window 122 at the bottom surface 124. Set slide switch 1 (s1), 35A, see FIG. 7B and FIG. 19B, and set slide switch 2 (s2) 35B, see FIG. 7B and FIG. 19B, are used to switch operational modes between Mode 1 and Mode 2, i.e. where operating in an ON mode (optical sensors are working) and in an OFF mode (optical sensors are inoperable).

Figure 22:
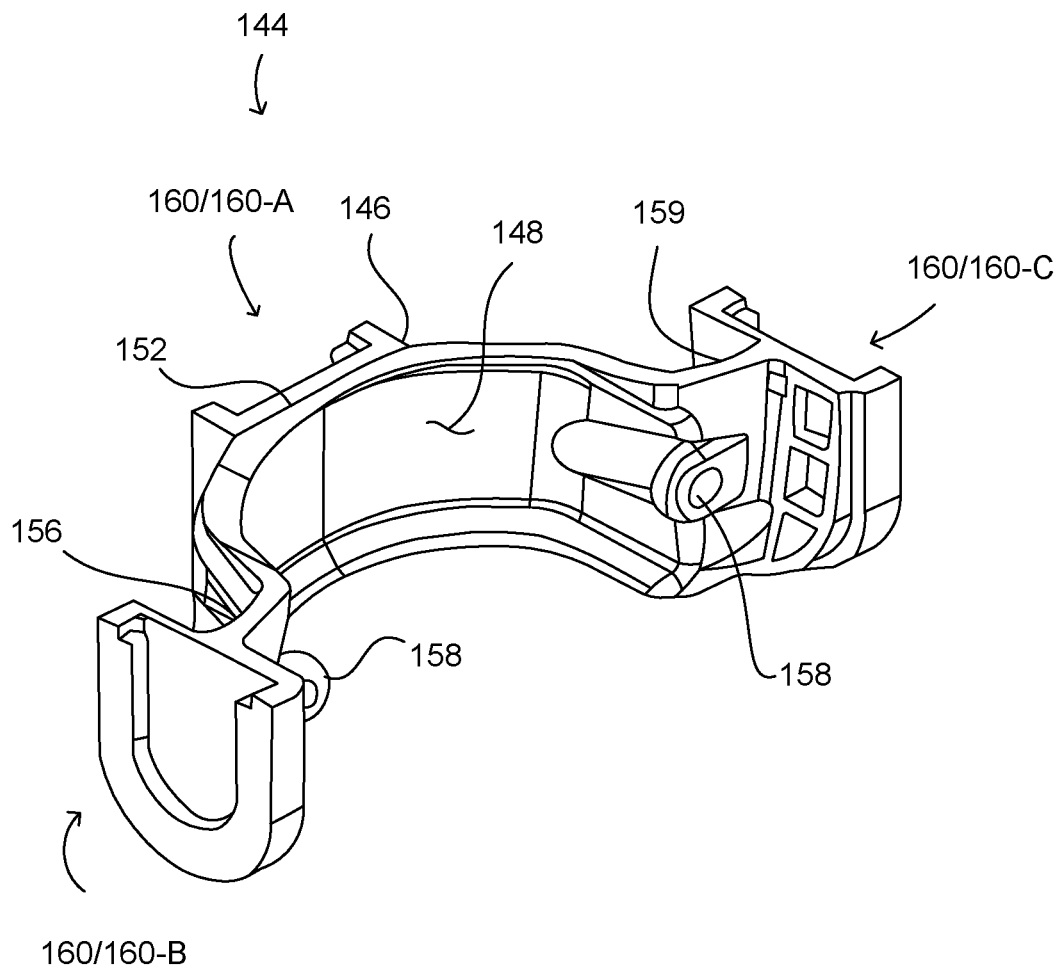
FIG. 22 is an illustrative example of a 3-position tool mount.
Figure 23:
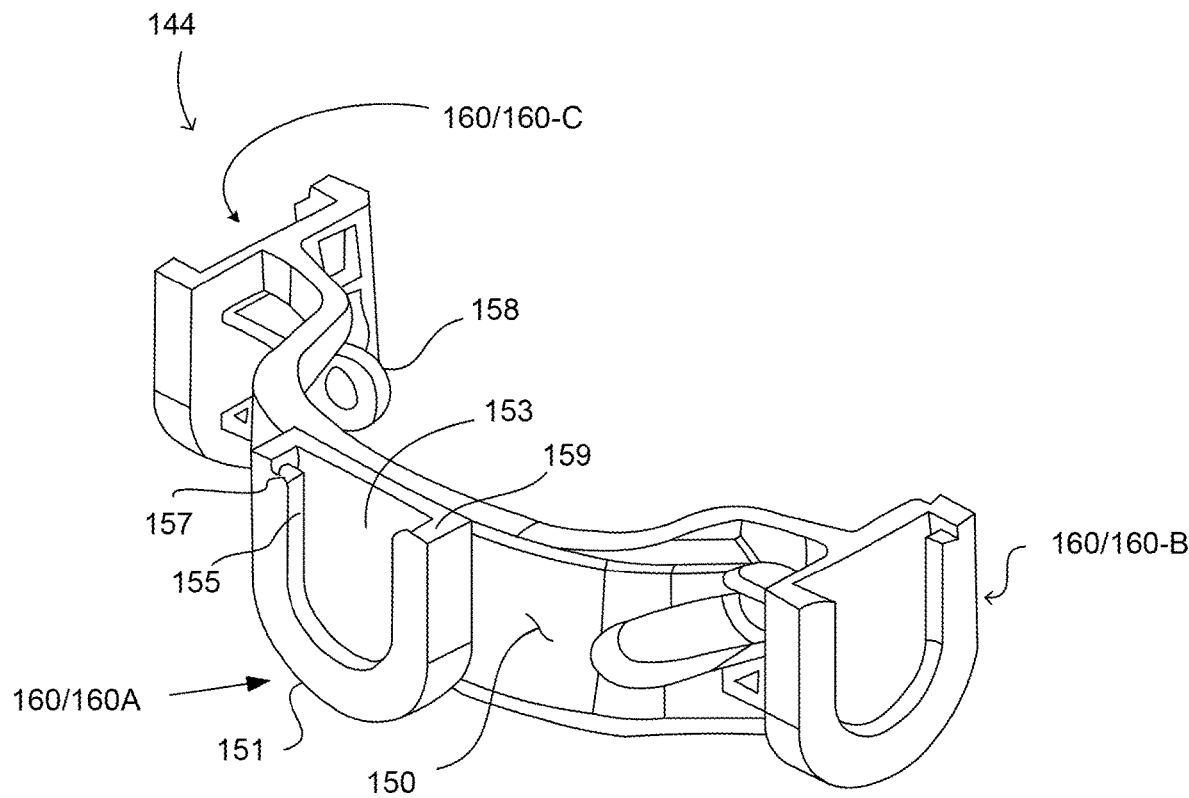
FIG. 23 is an illustrative view of the 3-position tool mount.
Figure 24:
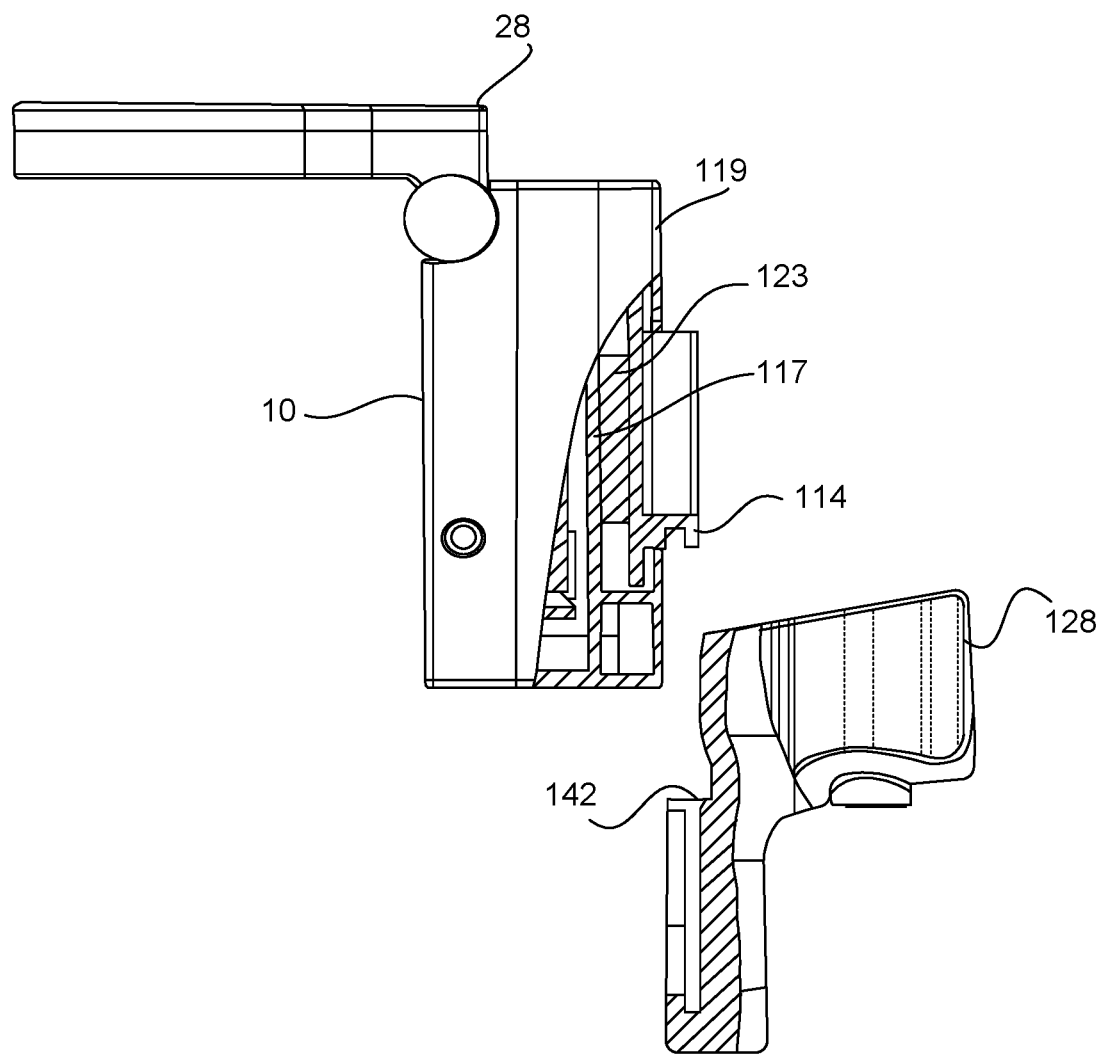
FIG. 24 shows a partial cross-sectional view illustrating the components for securing the object orientation indicator to the tool mount.
Figure 25:
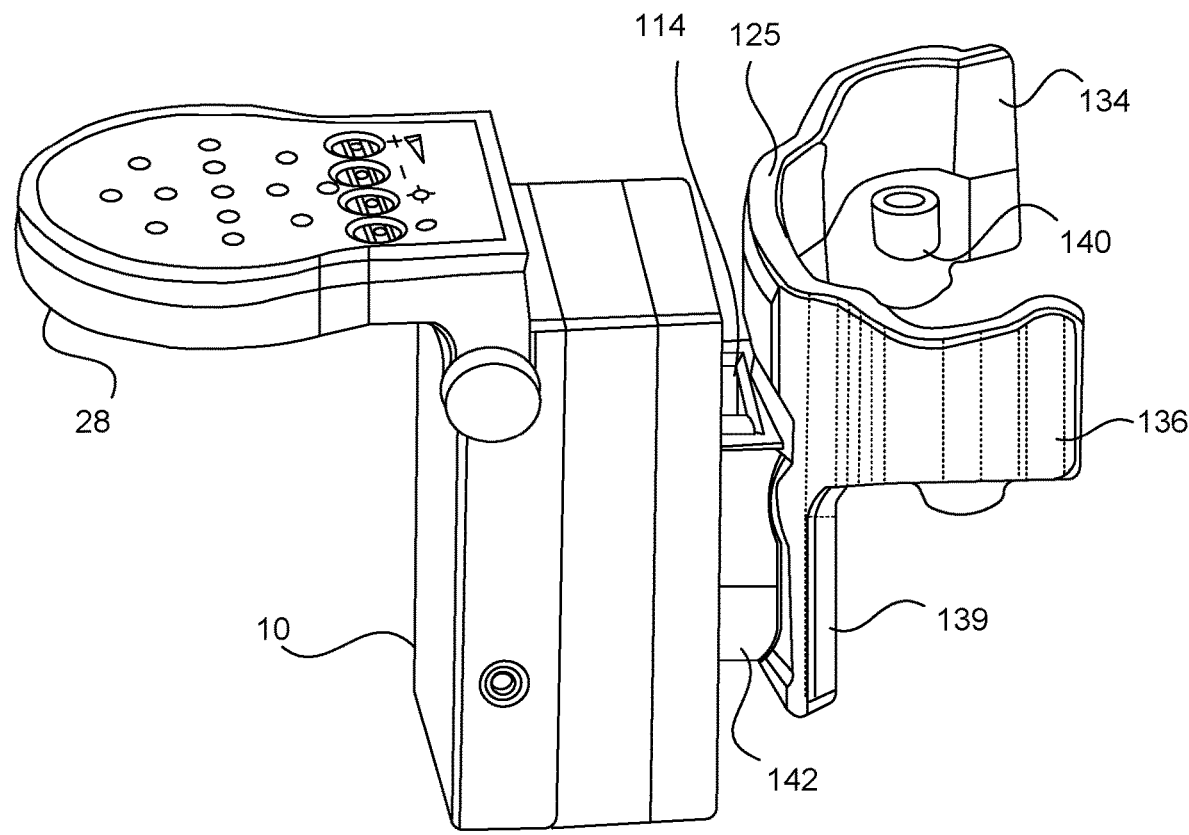
FIG. 25 illustrates the 1-position tool mount secured to the object orientation indicator.
Figure 26:
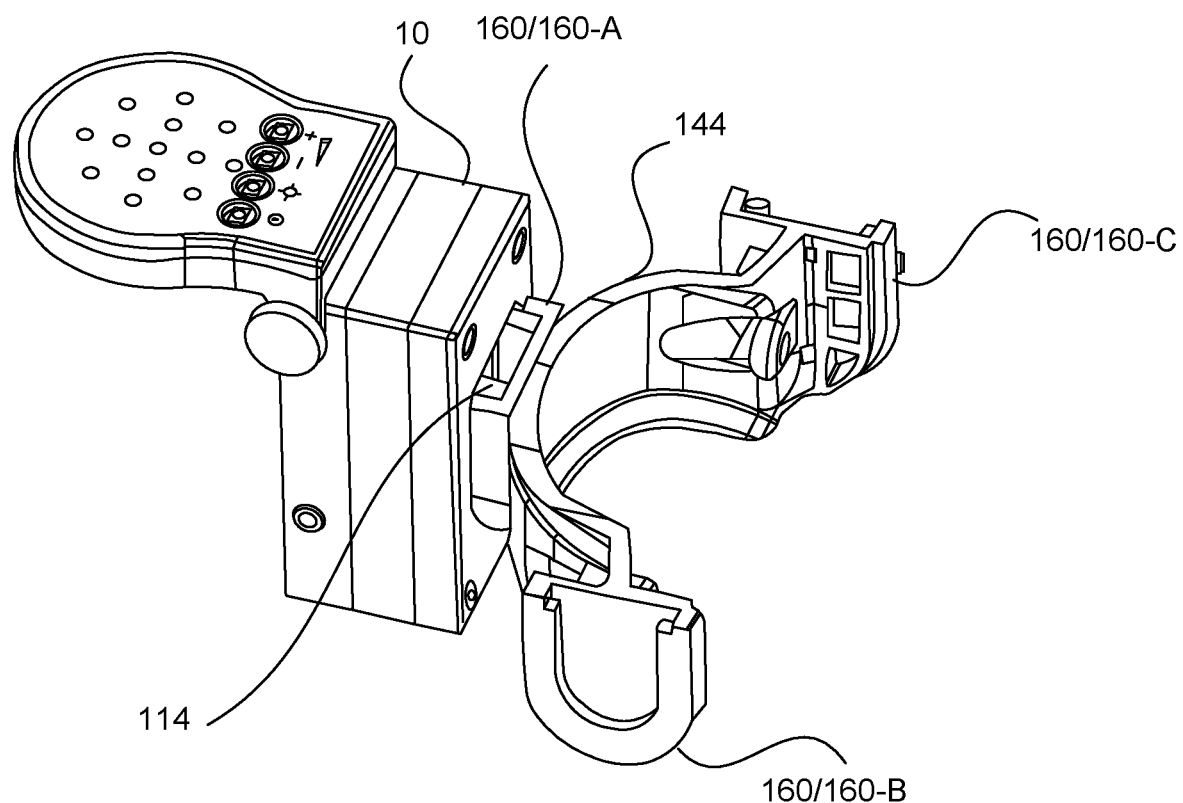
FIG. 26 illustrates the multiple position tool mount secured to the object orientation indicator.

The object orientation indicator 10 may be secured to one or more types of tools using a one (1) position mounting device (see FIGS. 20 and 21) or a multiple position mounting device (see FIGS. 22 and 23). The one position tool mounting device 125 shown in FIGS. 20 and 21 includes a main body 126 having an inner surface 128 (surface that rests against the tool) and an outer surface 130. The main body 126 may be sized and shaped to mirror at least a portion of the outer surface of a tool that it will attach there to. In this embodiment, the main body 126 has front wall 132 flanked by two winged appendages 134 and 136, that together form a partially curved profile. The two winged appendages 134 and 136 may include curved surfaces 131, 133 for securing to rounded surfaces of a tool. The front wall 132 contains a bottom end 139 extends below or past the appendages 134 and 136. Opening 140 allows the use of a screw to secure to the tool. The outer surface 130 includes an object orientation indicator mounting member 142 (same as dock 102). The object orientation indicator tool mounting member 142 is keyed, having a corresponding conjugate shape, to fit with and lock to object orientation indicator locking member 114, see FIGS. 20 and 21. The object orientation indicator mounting member 142 may also include an object orientation indicator locking receiving member 141, illustrated herein as a channel 143, and a body 145 and tabs or overhangs 147 and 149, sized and shaped to engage with or receive and hold therein an object orientation indicator locking member 114.

Referring to FIGS. 22 and 23, the multiple (three) position tool mounting device 144 is shown. The multiple position mounting device 144 includes a main body 146 having an inner surface 148 (surface that rests against the tool) and an outer surface 150. The main body 146 may be sized and shaped to mirror at least a portion of the outer surface of a tool that it will attach there to. In this embodiment, the main body 146 has a curved or concave inner surface 152 (convex outer surface) flanked by two winged appendages 154 and 156. Opening 158 allows the use of a screw to secure to the tool. The outer surface 150 includes multiple object orientation indicator mounting members 160, one in the front (individually referred to as 160-A) and two on the sides (individually referred to as 160-B and 160-C). The two, side multiple object orientation indicator mounting members 160B and 160C may be arranged at about 180 degrees from each other.

Figure 27A:
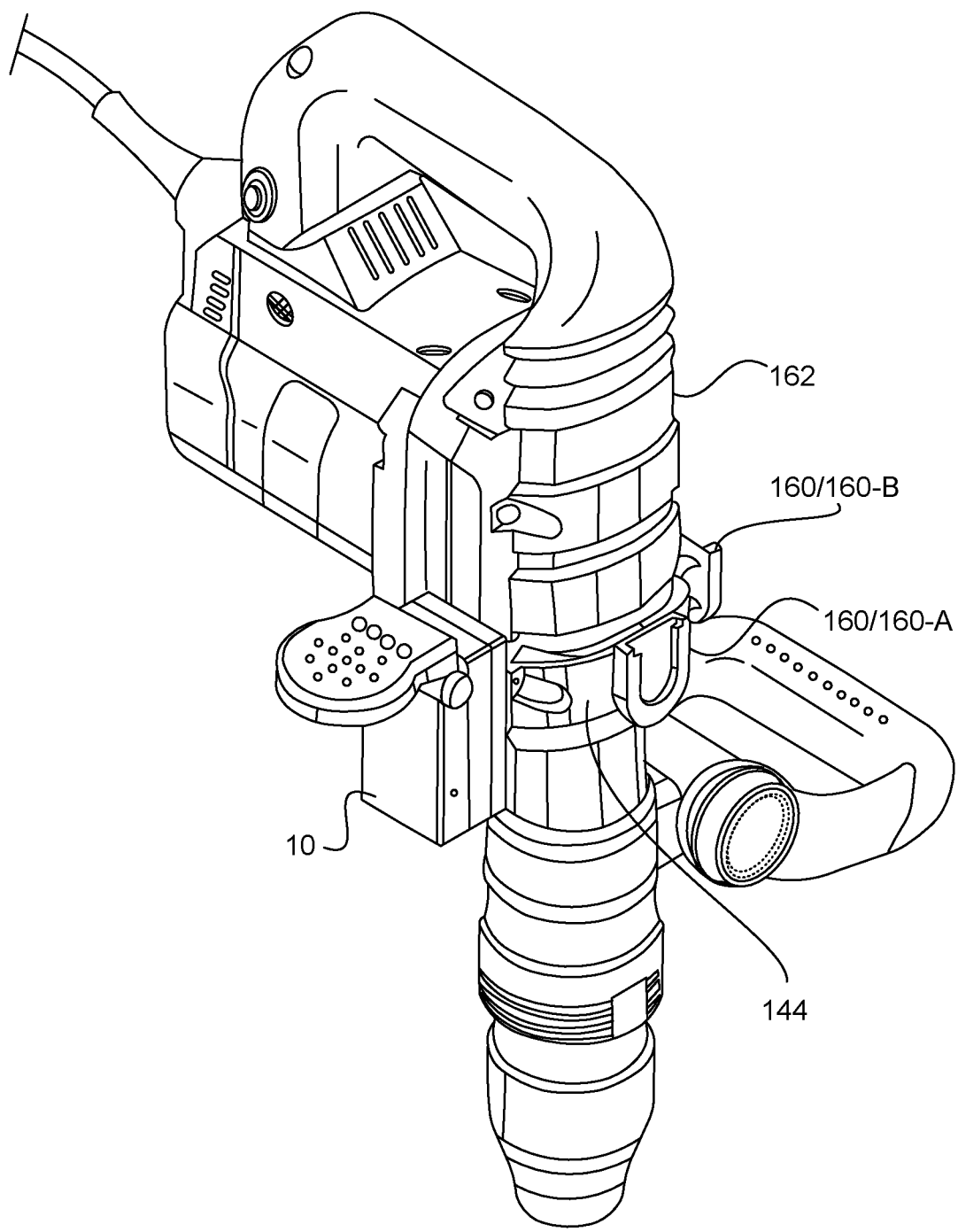
FIG. 27A illustrates the multiple position tool mount, secured to the object orientation indicator, mounted to a stake driver/demolition hammer tool.
Figure 27B:
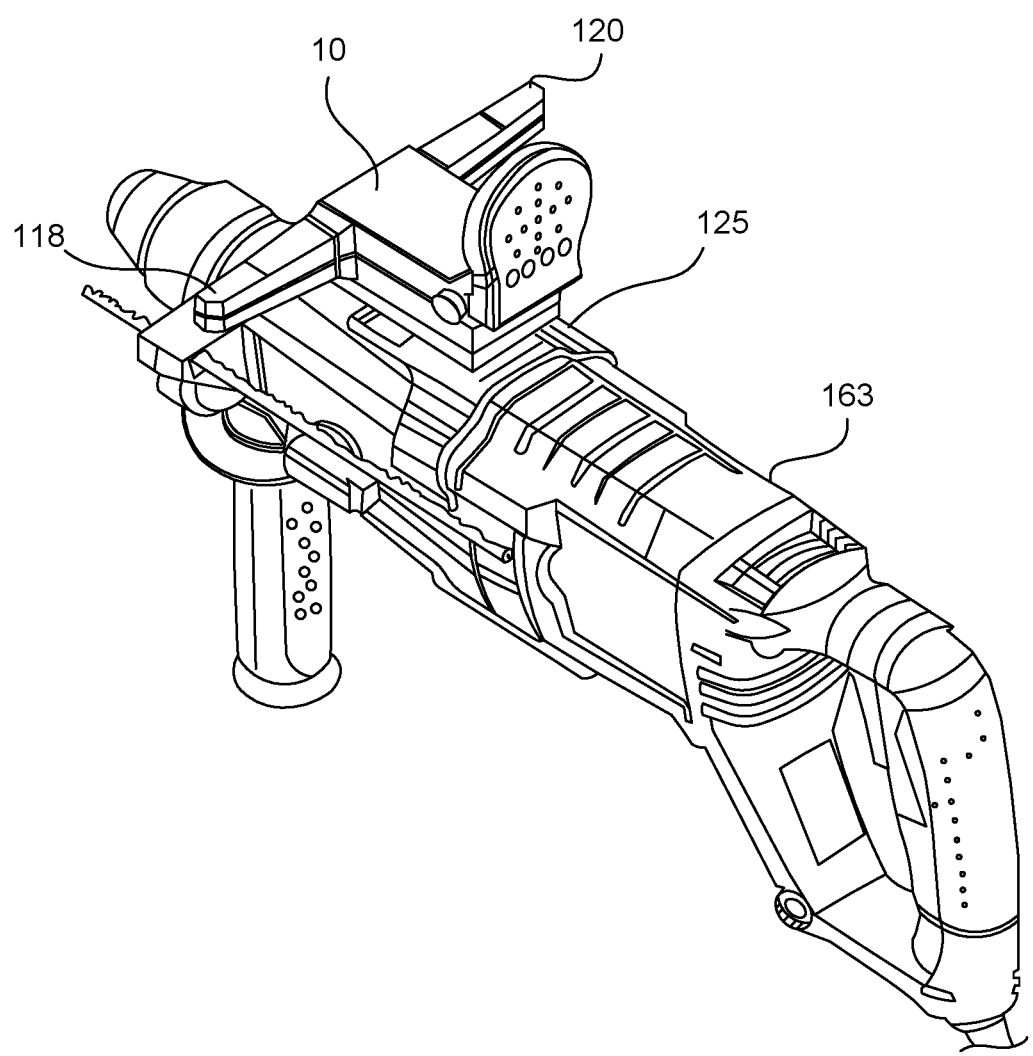
FIG. 27B illustrates the one position tool mount, secured to the object orientation indicator, mounted to a hammer drill.

Each side multiple object orientation indicator mounting member, 160B and 160C, may be arranged 90 degrees from the center multiple object orientation indicator mounting member 160A. The object orientation indicator tool mounting members 160 are keyed, having a corresponding conjugate shape, to fit with and lock to the object orientation indicator locking member 114, see FIG. 29. The multiple object orientation indicator mounting members 160 may have the same features as dock 102. Each multiple object orientation indicator mounting member 160 is keyed, having a corresponding conjugate shape, to fit with and lock to object orientation indicator locking member 114. The multiple object orientation indicator mounting member 160 may also include an object orientation indicator locking receiving member 151, illustrated herein as a channel 153, and a body 155 and tabs or overhangs 157 and 159, sized and shaped to engage with or receive and hold therein an object orientation indicator locking member 114. FIG. 27A shows the object orientation indicator 10 (without optical sensors) secured to the multiple position mounting device 144, which is mounted to a stake driver/demolition 162. FIG. 27B shows the object orientation indicator 10 (with optical sensors) secured to the one position mounting device 125, which is mounted to a hammer drill 163.

Figure 28:
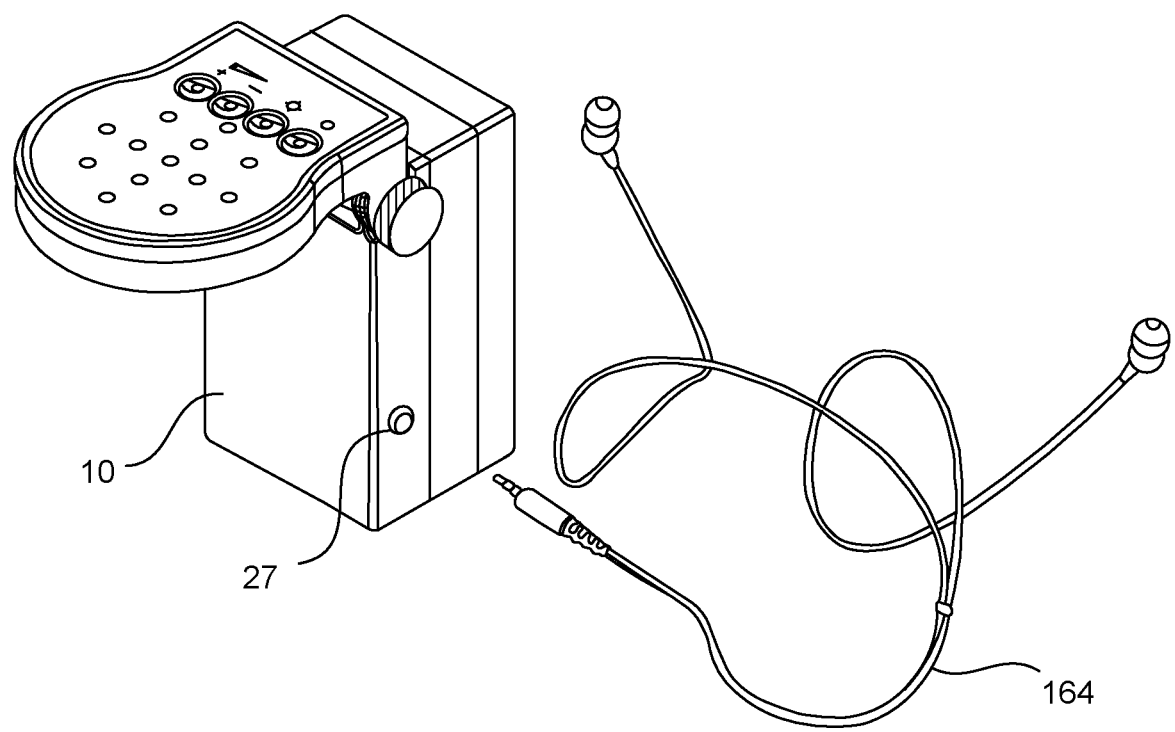
FIG. 28 illustrates the connecting of the object orientation indicator to a wired headphone/ear bud.

Referring to FIG. 28, the object orientation indicator 10 is shown connecting to a wired headphone/ear bud 164 via the headphone/ear phone jack connector 27. As the object orientation indicator 10 is wireless enabled, through for example Bluetooth technology, wireless ear buds may be used as well.

Figure 29:
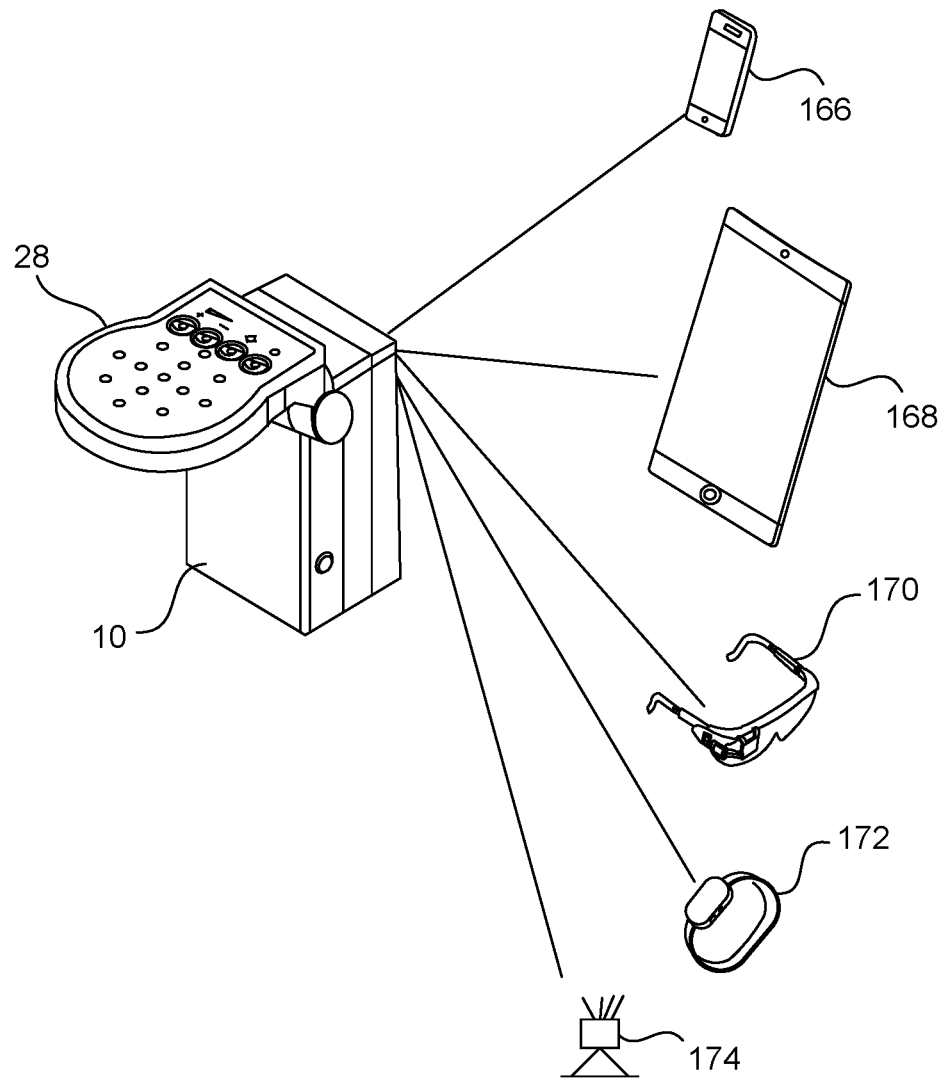
FIG. 29 illustrates the wireless communication between the object orientation indicator and various electronic devices.
Figure 30:
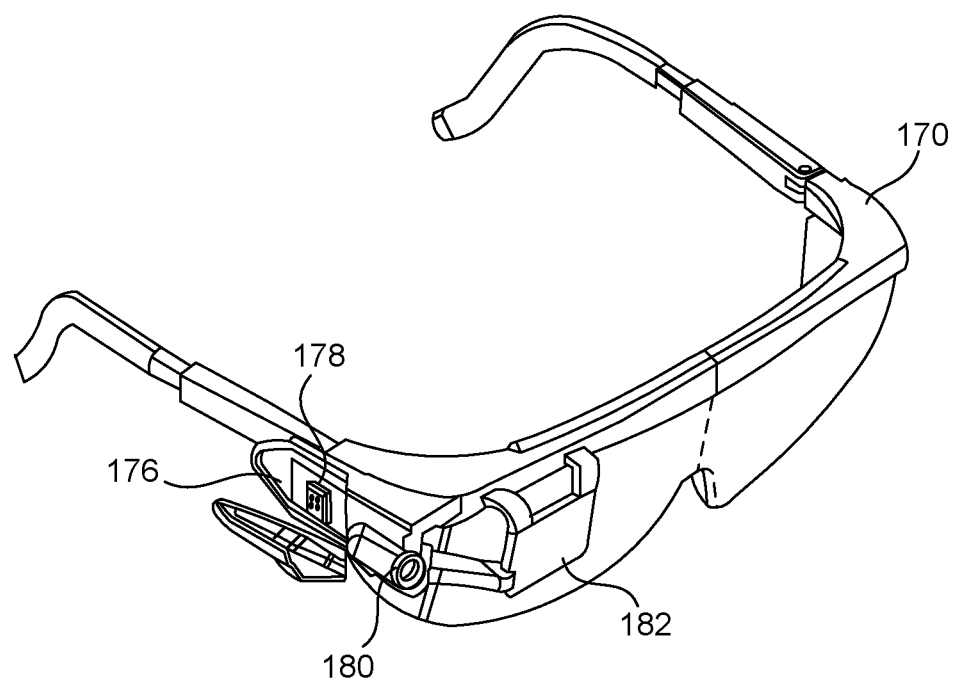
FIG. 30 illustrates the use of glasses for displaying object orientation information received from the object orientation indicator.

The object orientation indicator 10 may also be operatively coupled to other devices to display object orientation information, such as but not limited to electronic devices, such as smart phones 166, computers 168, glasses 170, smart watches 172, or a heads-up display device 174, see FIG. 29. FIG. 30 illustrates the object orientation indicator 10 attached to a pair of glasses 170. In this case, a housing 176 having Bluetooth technology 178 (receiver and/or transmitter) may, wirelessly, receive object orientation information from the object orientation indicator 10, and via a video output (camera/lens) 180 output the data to a display screen 182 clipped to the glasses 170.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures, and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A device for determining an orientation of an object, comprising:
    a housing assembly configured for receiving and storing therein one or more components that drive functionality,
    a display panel for displaying object orientation information;
    multiple sensors for providing object orientation information,
    at least one sensor of said multiple sensors provides orientation information for an object placed on or being inserted into a surface that is parallel to a ground surface; and
    at least one sensor of said multiple sensors includes at least one optical sensor, said at least one optical sensor provides orientation information for an object placed on or being inserted into a surface which is non-parallel to said ground surface.

2. The device for determining the orientation of an object according to claim 1, wherein said at least one sensor for determining orientation information for an object placed on or being inserted into a surface that is parallel to a ground surface is an accelerometer.

3. The device for determining the orientation of an object according to claim 1, further including a barometric sensor.

4. The device for determining the orientation of an object according to claim 1, wherein said display panel is traversable from a first position to at least a second position.

5. The device for determining the orientation of an object according to claim 1, wherein said display panel includes a user interface.

6. The device for determining the orientation of an object according to claim 1, wherein said object orientation information may be displayed on an independent electronic device.

7. The device for determining the orientation of an object according to claim 6, wherein said device communicates electronically with said independent electronic device using wireless technology.

8. The device for determining the orientation of an object according to claim 6, wherein said independent electronic device is a smart phone, computer, or computer tablet.

9. The device for determining the orientation of an object according to claim 6, wherein said independent electronic device is smart watch.

10. The device for determining the orientation of an object according to claim 6, wherein said independent electronic device is a pair of smart glasses.

11. The device for determining the orientation of an object according to claim 1, further configured to produce audio.

12. The device for determining the orientation of an object according to claim 1, further including an anti-shock member.

13. The device for determining the orientation of an object according to claim 1, further including a mount configured to secure said device to a tool.

14. A device for determining an orientation of an object comprising:
    a housing assembly configured for receiving and storing therein one or more components that drive functionality,
    a display panel for displaying object orientation information;
    at least one sensor for providing orientation information for an object placed on or being inserted into a surface that is parallel to a ground surface; and
    an object orientation indicator locking member constructed and arranged to engage or fit with a corresponding mounting member.

15. The device for determining the orientation of an object according to claim 14, further including a tool mounting device constructed and arranged to secure to a tool.

16. The device for determining the orientation of an object according to claim 15, wherein said tool mounting device comprises at least one object orientation indicator tool mounting member.

17. The device for determining the orientation of an object according to claim 15, wherein said tool mounting device comprises at least three object orientation indicator mounting members.

18. The device for determining the orientation of an object according to claim 14, further including at least one optical sensor, said at least one optical sensor providing orientation information for an object placed on or being inserted into a surface which is non-parallel to said ground surface.

19. The device for determining the orientation of an object according to claim 14, further including a barometric sensor.

20. The device for determining the orientation of an object according to claim 14, wherein said object orientation information may be displayed on an independent electronic device.

21. The device for determining the orientation of an object according to claim 20, wherein said device communicates electronically with said independent electronic device using wireless technology.

22. The device for determining the orientation of an object according to claim 20, wherein said independent electronic device is a smart phone, computer, or computer tablet.

23. The device for determining the orientation of an object according to claim 20, wherein said Independent electronic device is smart watch.

24. The device for determining the orientation of an object according to claim 14, further configured to produce audio.

25. The device for determining the orientation of an object according to claim 1, further including an object orientation indicator locking member constructed and arranged to engage or fit with a corresponding mounting member.

* * * * *